US008763519B2

(12) United States Patent
Ricchio et al.

(10) Patent No.: US 8,763,519 B2
(45) Date of Patent: Jul. 1, 2014

(54) GRILL FOR COOKING HUMAN FOOD WITH LOWER AND UPPER PLATENS AND COUNTERBALANCE ASSEMBLY

(75) Inventors: Frank Ricchio, Clarkson Valley, MO (US); Douglas Vogt, Ballwin, MO (US); Phil Ranft, Ellisville, MO (US); Kenneth Schaller, O'Fallon, MO (US); Thomas Hooss, House Springs, MO (US); Paul Farrell, Dardenne Prairie, MO (US); Dale L. Picolet, House Springs, MO (US); Corey S. Feit, St. Louis, MO (US)

(73) Assignee: Star Manufacturing International, Inc., St. Louis, MO (US)

( * ) Notice: Subject to any disclaimer, the term of this patent is extended or adjusted under 35 U.S.C. 154(b) by 329 days.

(21) Appl. No.: 12/629,659

(22) Filed: Dec. 2, 2009

(65) Prior Publication Data
US 2010/0206180 A1 Aug. 19, 2010

Related U.S. Application Data

(60) Provisional application No. 61/119,196, filed on Dec. 2, 2008.

(51) Int. Cl.
*A47J 37/06* (2006.01)
(52) U.S. Cl.
USPC .................. 99/349; 99/372; 99/379; 219/525
(58) Field of Classification Search
USPC ........... 99/372, 374, 377–380, 422–424, 426, 99/427
See application file for complete search history.

(56) References Cited

U.S. PATENT DOCUMENTS

| | | | | |
|---|---|---|---|---|
| 723,654 A | * | 3/1903 | Curtiss | 432/225 |
| 992,417 A | * | 5/1911 | Gale | 99/379 |
| 2,765,727 A | * | 10/1956 | Lipsich et al. | 99/331 |
| 2,985,094 A | * | 5/1961 | Shaw et al. | 99/331 |
| 4,571,775 A | | 2/1986 | Leonard | |
| 5,341,727 A | * | 8/1994 | Dickson | 99/335 |
| 5,473,976 A | * | 12/1995 | Hermansson | 99/349 |
| 5,555,794 A | * | 9/1996 | Templeton et al. | 99/349 |
| 5,755,150 A | | 5/1998 | Matsumoto et al. | |
| 5,791,234 A | | 8/1998 | Newton et al. | |
| 5,890,419 A | * | 4/1999 | Moravec | 99/349 |
| 5,910,207 A | | 6/1999 | Newton et al. | |
| 6,016,743 A | | 1/2000 | Glavan | |
| 6,257,126 B1 | * | 7/2001 | Veljkovic et al. | 99/349 |
| 6,363,835 B1 | | 4/2002 | Wu | |

(Continued)

FOREIGN PATENT DOCUMENTS

| | | | | |
|---|---|---|---|---|
| FR | 2332727 | * | 6/1977 | A47J 37/06 |
| FR | EP 0094637 | * | 11/1983 | A47J 37/06 |

*Primary Examiner* — Gene Kim
*Assistant Examiner* — John E Simms, Jr.
(74) *Attorney, Agent, or Firm* — Polster Lieder Woodruff & Lucchesi, L.C.

(57) ABSTRACT

A food cooking grill assembly has a housing that supports a lower platen which has a cooking surface, and an upper platen having a cooking surface. A handle assembly connects to the upper platen. Handle assembly connects to a guidance assembly and to a hinged and pivotal counterbalance assembly to control the orientation and position of the upper platen relative to the lower platen. The counterbalance assembly interacts between the upper platen and the housing to counter the weight of the upper platen and to react to force exerted through the handle assembly.

14 Claims, 17 Drawing Sheets

(56) References Cited

U.S. PATENT DOCUMENTS

| | | | |
|---|---|---|---|
| 6,439,108 B1 * | 8/2002 | Wu | 99/349 |
| 6,467,400 B2 | 10/2002 | Raio et al. | |
| 6,595,116 B1 | 7/2003 | Lin | |
| 6,736,051 B2 | 5/2004 | Frantz et al. | |
| 2002/0033101 A1 | 3/2002 | Raio et al. | |
| 2003/0051605 A1 | 3/2003 | Frantz et al. | |
| 2009/0308260 A1 * | 12/2009 | Trost | 99/349 |

* cited by examiner

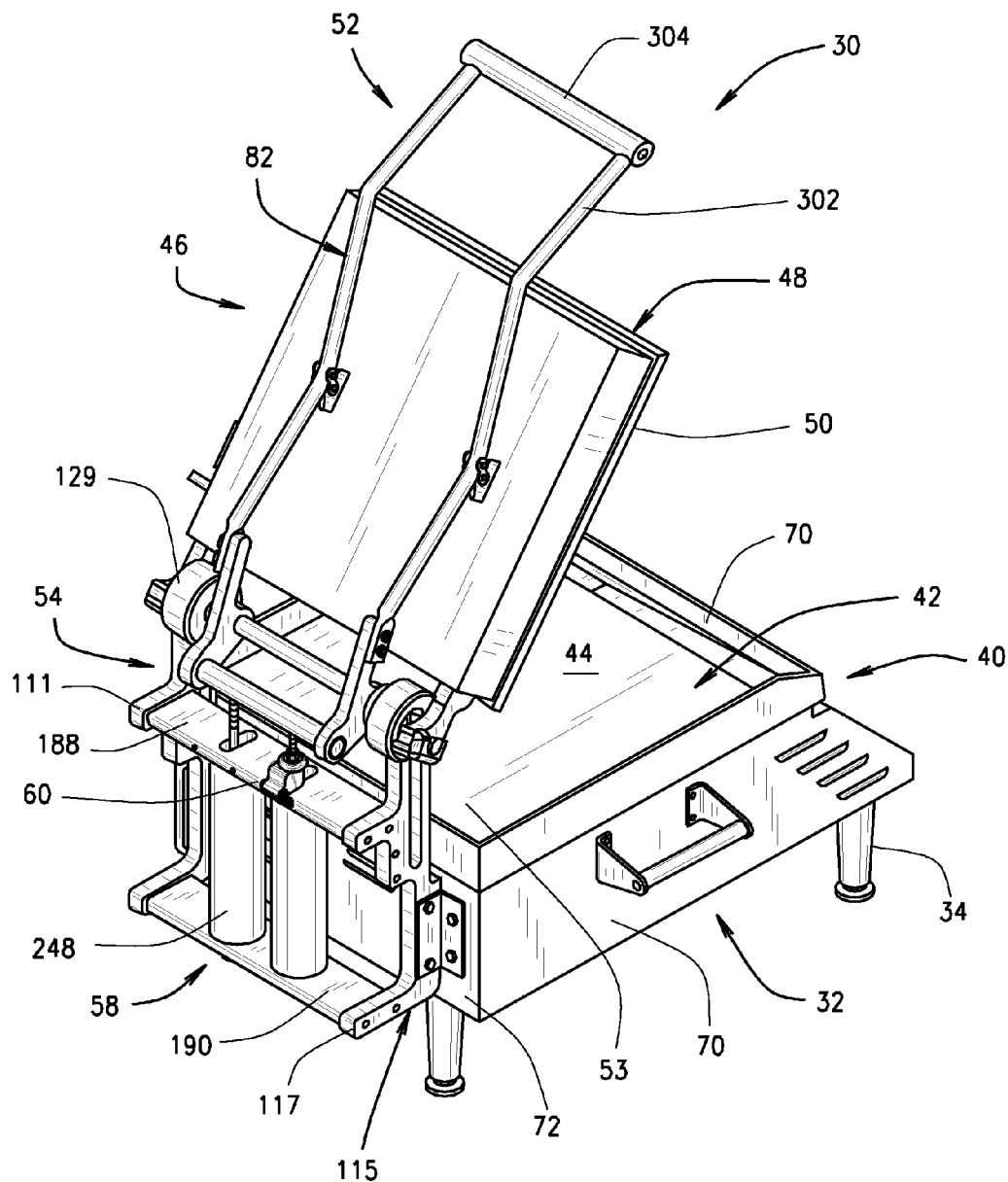
F I G . 1

SECTION B-B

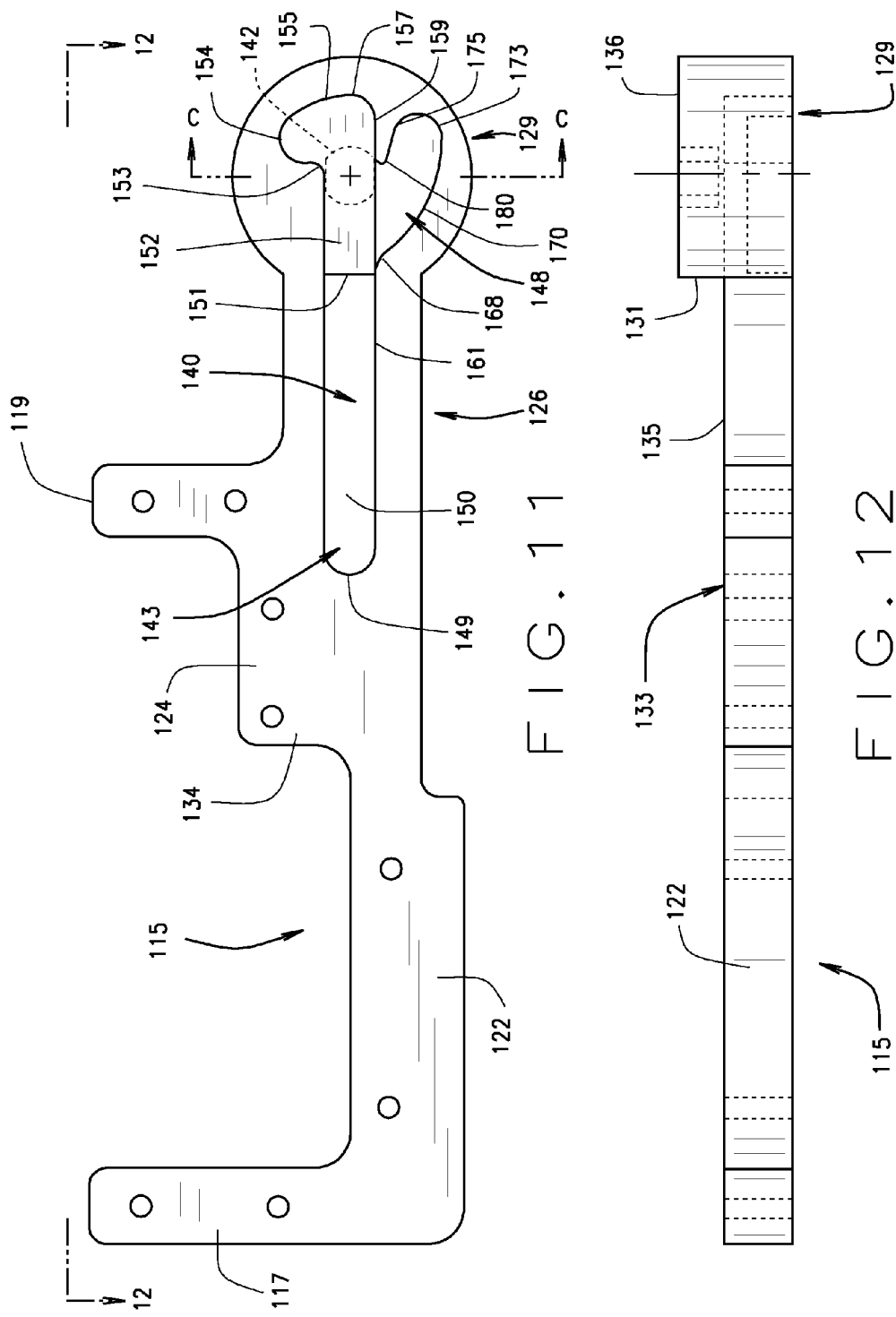

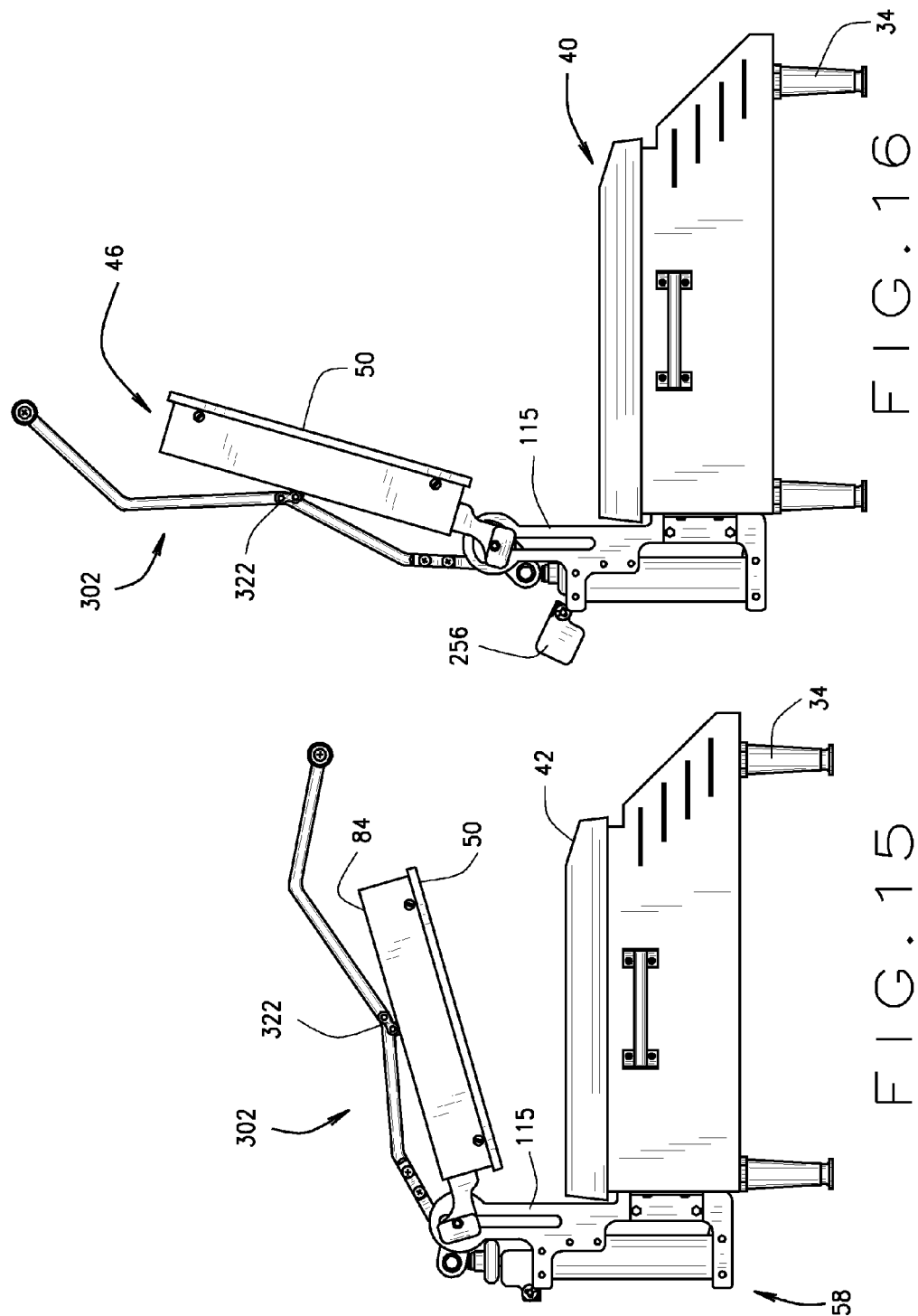

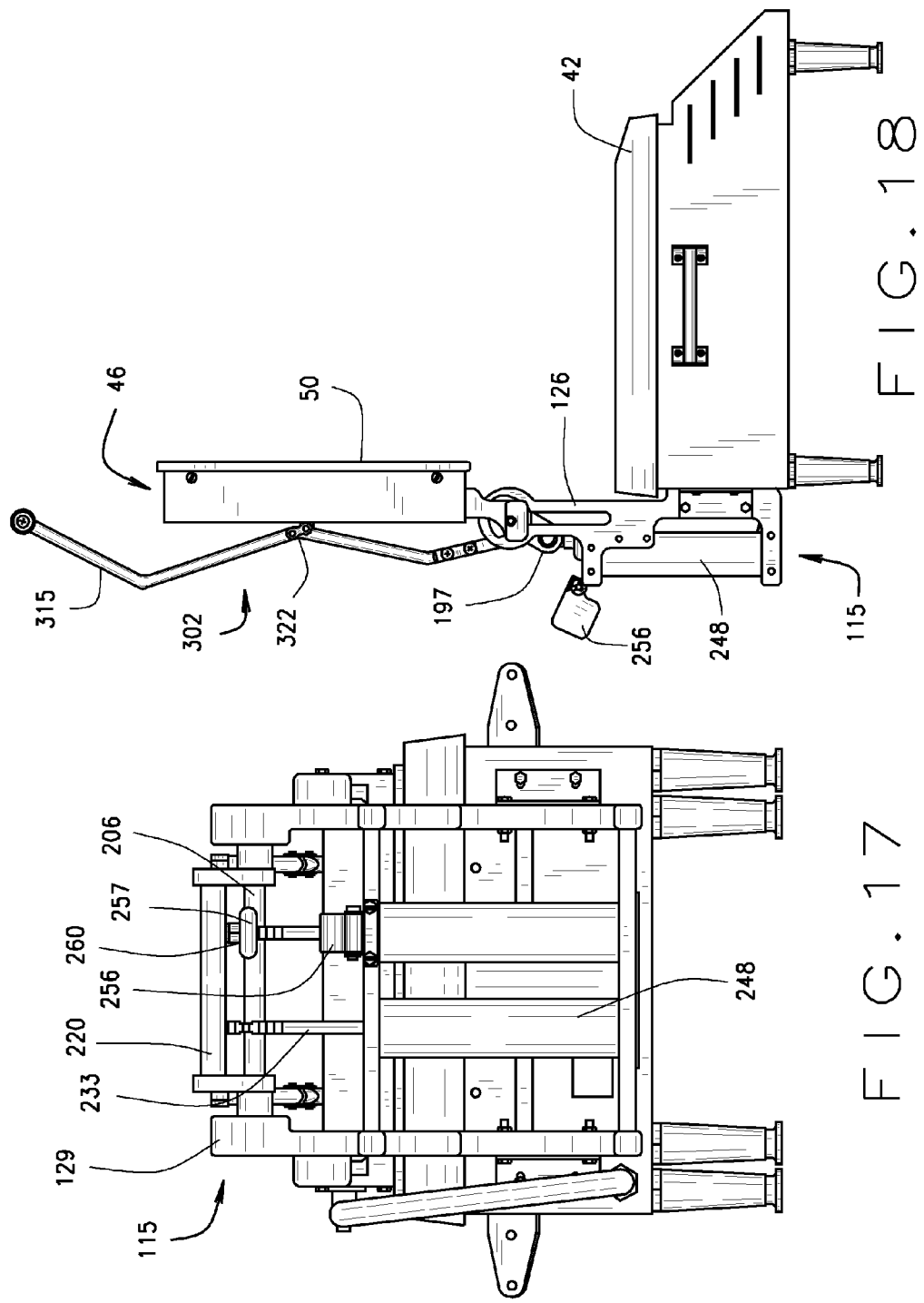

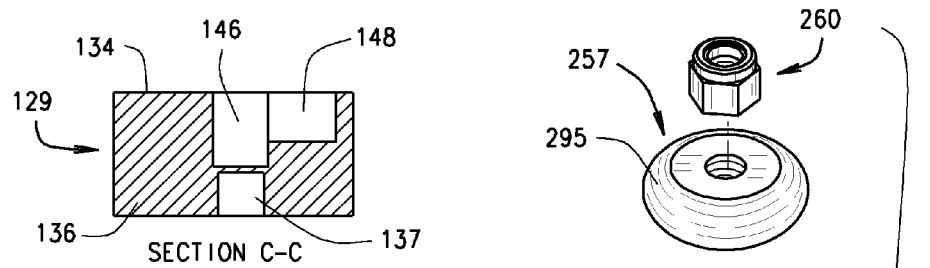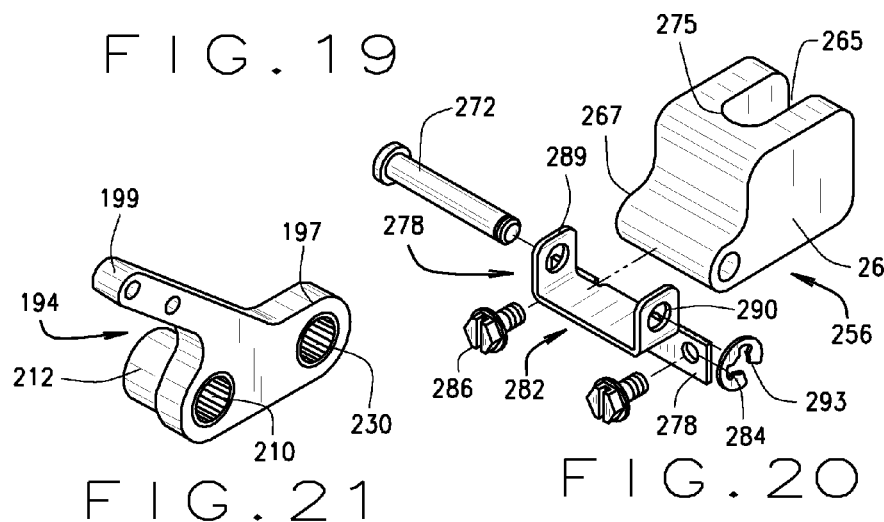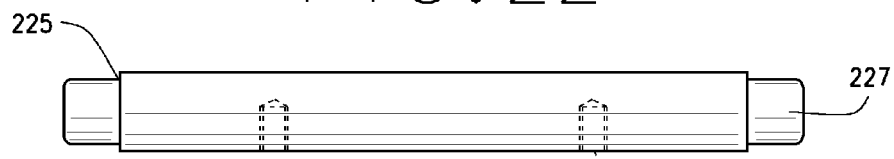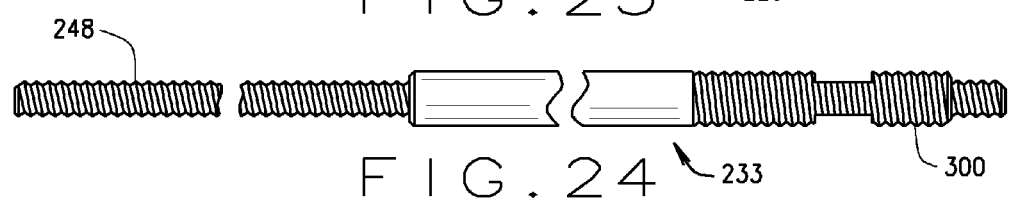

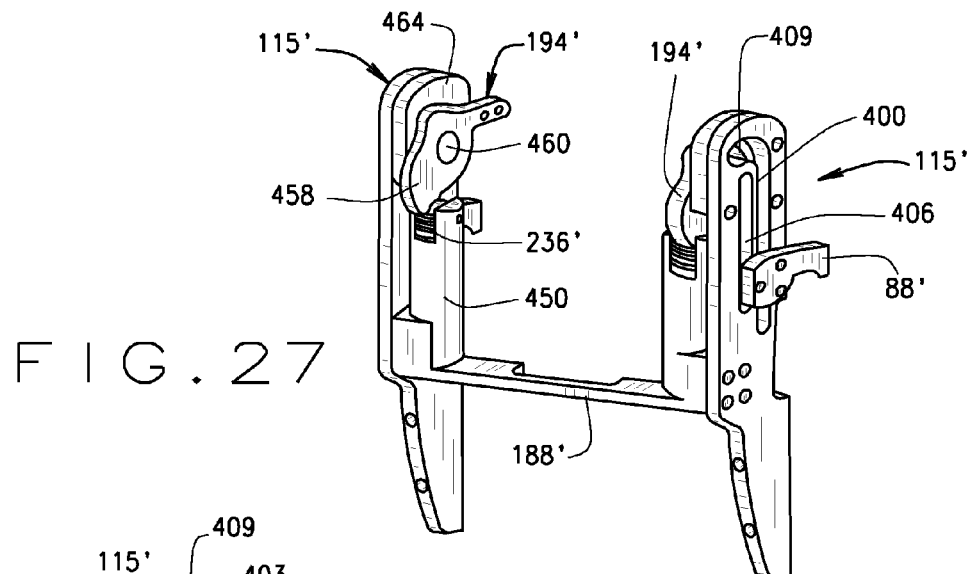
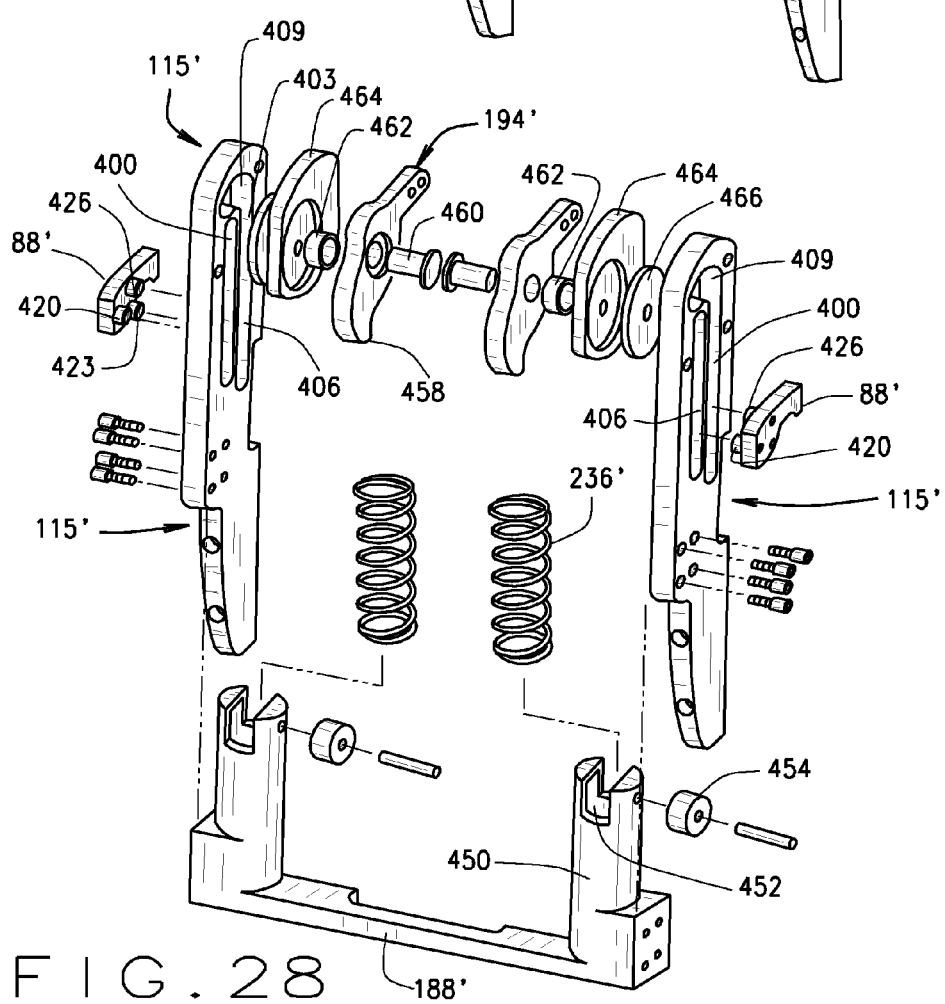

GRILL FOR COOKING HUMAN FOOD WITH LOWER AND UPPER PLATENS AND COUNTERBALANCE ASSEMBLY

CROSS-REFERENCE TO RELATED APPLICATIONS

This application is related to U.S. Provisional Patent Application No. 61/119,196 filed Dec. 2, 2008 from which priority is claimed, and is hereby incorporated by reference.

STATEMENT REGARDING FEDERALLY SPONSORED RESEARCH

Not Applicable.

BACKGROUND OF THE INVENTION

The present disclosure relates to a grill for cooking human food employing a lower cooking platen and a movable upper cooking platen having a counterbalance assembly to enhance control of the upper and lower cooking surfaces.

The food service industry uses numerous cooking appliances in the preparation of various food items. Particularly, commercial eateries use a two-sided cooking appliance such as a sandwich grill, also referred to as a press grill or contact toaster to prepare panini's, sandwiches, hamburger patties, and other food items. This type of cooking appliance cooks food items from two sides to reduce overall cooking times.

Generally, a sandwich grill includes a rectangular housing with a stationary lower cooking platen and a pivoting upper cooking platen, which are both operatively connected to a power source for heating the platens to a predetermined temperature. The upper cooking platen is pivotally attached about a single axis to the housing for movement between a raised position with the upper cooking platen being inclined upwardly from the lower cooking platen, and a cooking position with the upper cooking platen overlying the lower cooking platen. Typically, in the cooking position the upper cooking platen and the lower cooking platen are separated by a gap for receiving food items. In some sandwich grills, the gap can be manually adjusted or selected to different sizes to accommodate food items of different thicknesses.

However, conventional sandwich grills suffer from various deficiencies which detract from their overall utility. For example, conventional sandwich grills often make contact with food items unevenly, thereby, causing problems such as uneven cooking, over cooking or burning of portions of the food items, and undercooking of portions of food items. Since the upper platen's connection to the housing pivots about a single axis, the upper platen is only parallel with the lower platen at one angular position. Therefore, if the food item is a greater or lesser thickness than the gap, the upper platen contacts the food item at a non-parallel angle relative to the lower platen, which results in uneven cooking. Moreover, the non-parallel contact places undesirable stresses on the components of the sandwich grill, which increase wear and failure of the sandwich grill.

In addition, conventional sandwich grills have no control over the forces applied to the food items. Typically, in the cooking position the upper platen rests on the food items by virtue of gravity. Therefore, compressive forces on the food item are determined by the weight of the upper platen, which can smash, squash, or otherwise damage smaller or softer food items.

An example of a pivoting two platen cooking grill with counterbalance is shown in U.S. Pat. No. 6,257,126. That patent discloses a handle that is connected to a pair of pivot arms 397 and 397a having cam surfaces with corresponding cam followers 389 and 390 that are connected to a counterbalance to move the upper platen to different positions relative to the lower platen. That patent also discloses a pair of catch rods 403 having feet 407 that engage the upper surface of the casing for the upper platen to resist the rear edge of the upper platen cooking surface from pivoting to extend behind the rear of the casing for the lower platen. This restriction on location keeps grease and juice on the cooking surface of the upper platen from dripping on the counter or support surface to the rear of the lower casing.

The repetitive opening and shutting of the upper platen relative to the lower platen for such a food grill produces wear and tear on the cam surfaces, which in turn can cause the upper platen to not make contact with the lower platen over time. Additionally, wear between the support pins and the cams can cause tilting of the upper platen from side to side.

In the design of U.S. Pat. No. 6,257,126 the handle rods 408 are connected to the upper platen casing by pivot mounts attached to the casing. The pivot mounts have a pin that extends through a bore in each handle rod 408. Such mounting is not conducive to leveling the upper platen cooking surface to be parallel to the lower platen surface, and can lead to tilting of the upper platen surface, and uneven application of that surface to food items.

Thus, there is a need for a two platen food grill that evenly cooks food items regardless of variations in thickness, that provides improved control over the position of the upper platen and dripping of grease therefrom, and improved control of the force applied to food items, and further that operates to reduce wear and tear on parts that can cause unevenness of position of the upper platen.

DESCRIPTION OF THE DRAWINGS

In the accompanying drawings which form part of the specification:

FIG. 1 is a rear isometric view of a food cooking grill with lower and upper platens with a counterbalance assembly;

FIG. 11 is a side elevation view of a counterbalance support brace;

FIG. 12 is a rear elevation view of the counterbalance support of FIG. 11 taken along 12-12 of FIG. 11;

FIG. 15 is a side elevation view of the food grill with the upper platen shown at a point during a transition stage;

FIG. 16 is a side elevation view of the food grill with the upper platen in an open position;

FIG. 17 is a rear elevation of the food grill assembly when the stop disc is in an upper position;

FIG. 18 is a side elevation of the food cooking grill when the upper platen cooking surface is approximately perpendicular to the lower platen cook surface;

FIG. 19 is section view of the counterbalance support brace of FIGS. 11 and 12, taken along the lines C-C of FIG. 11;

FIG. 20 is an exploded isometric view of the stop assembly;

FIG. 21 is an isometric view of one of the force transmission members of the counterbalance assembly;

FIG. 22 is a bottom elevation of a crossbar that is mounted to the force transmission members;

FIG. 23 is a side elevation of the crossbar of FIG. 22;

FIG. 24 is a side elevation, partially broken, of a guide rod for a biasing member of the biasing assembly.

FIG. 27 is an isometric view of another embodiment of a counterbalance assembly and guidance assembly.

FIG. 28 is an exploded isometric view of the counterbalance assembly and guidance assembly of FIG. 27.

Corresponding reference numerals indicate corresponding parts throughout the several figures of the drawings.

DETAILED DESCRIPTION

Figure 2:
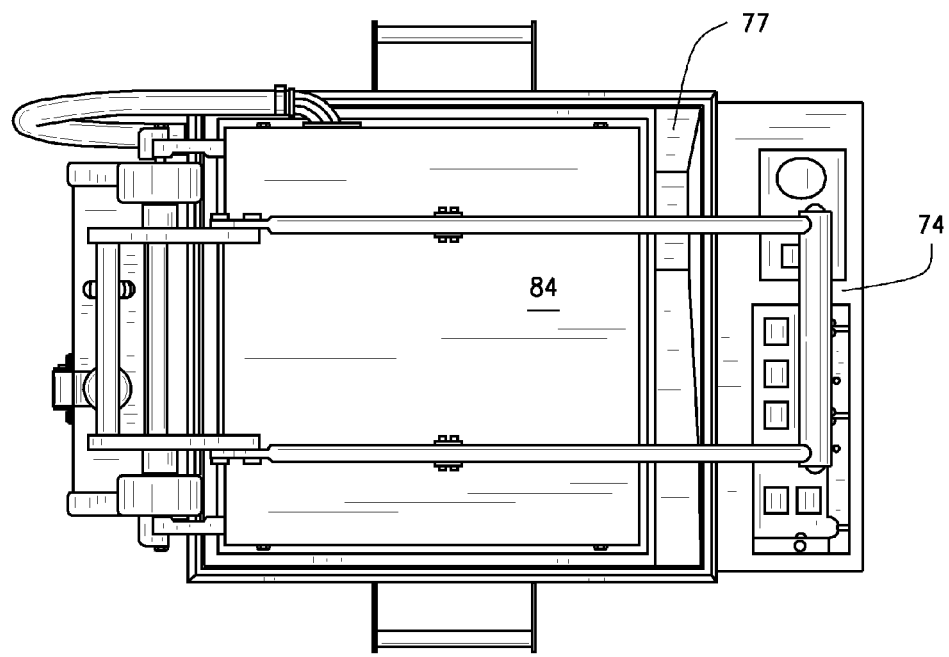
FIG. 2 is a top plan view of the food cooking grill with counterbalance assembly.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

As shown in the drawings, a food cooking grill assembly 30 generally comprises a lower base housing 32 which is supported by legs 34. Above the lower base housing 32 is mounted a lower platen ensemble 40. Ensemble 40 includes a lower platen 42 which has a cooking surface 44. Assembly 30 further comprises an upper platen ensemble 46 which includes an upper platen 48 having a cooking surface 50. Assembly 30 also has a handle assembly 52 that is connected to the upper platen ensemble 46. Handle assembly 52 is also connected to a guidance assembly 53 and to a hinged and pivotal counterbalance assembly 54. The guidance assembly 53 acts to control the orientation and position of the upper platen ensemble relative to the lower base housing 32 and lower platen ensemble 40. The counterbalance assembly 54 interacts between the upper platen ensemble 46 and the lower base housing 32 to counter the weight of the upper platen ensemble 46 and to react to force exerted through the handle assembly 52. The counterbalance assembly 54 includes a biasing assembly 58 that transmits a generally upward force on the upper platen ensemble 46 to reduce the downward force applied by the weight of the upper platen ensemble 46 and accessories, such as, a spatula, a burn guard, and the like. The grill assembly 30 may also include a stop assembly 60 that restricts the upward and pivotal movement of the upper platen ensemble 46.

The upper platen ensemble 46 can move between a cooking position (FIGS. 13-14) with the upper platen 48 generally parallel to and overlying the lower platen surface 44, through a transition stage (points of which are seen in FIGS. 15 and 16) with the upper platen 48 being generally inclined relative to the lower platen surface 44, and a vertical position (FIG. 18) with the upper platen surface 50 being generally vertical and perpendicular to the lower platen surface 44.

Figure 3:
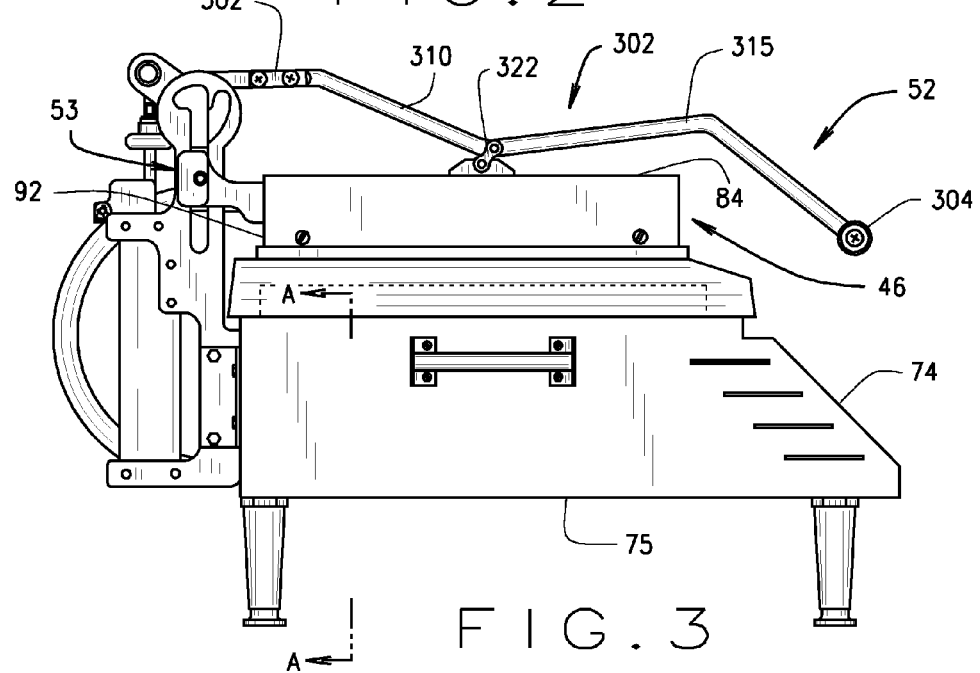
FIG. 3 is a side elevation view of the food cooking grill with counterbalance assembly.
Figure 4:
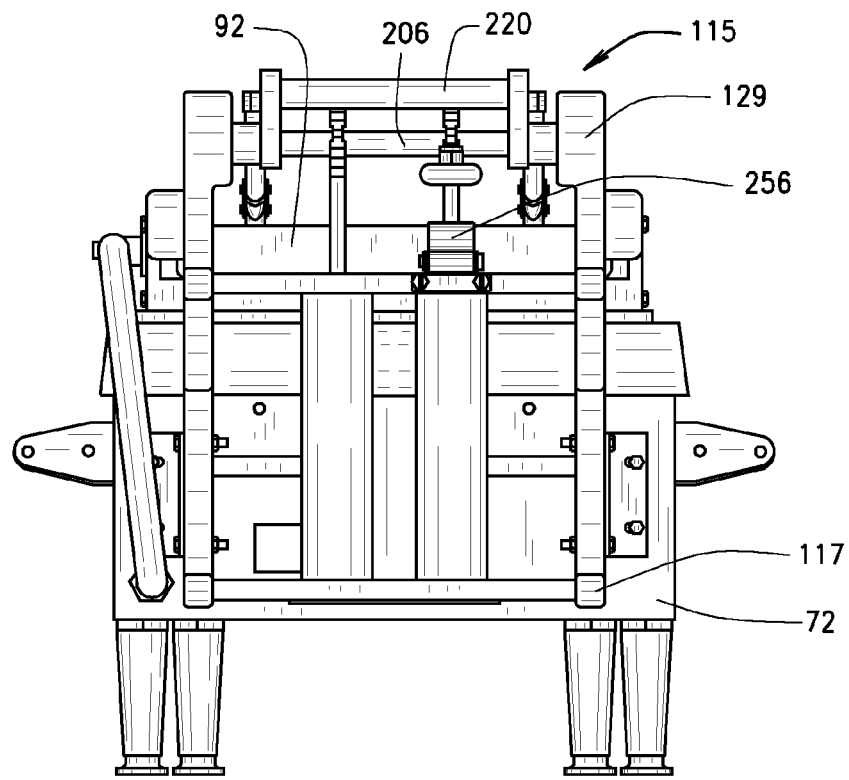
FIG. 4 is a rear elevation view of the food cooking grill with counterbalance assembly.
Figure 5:
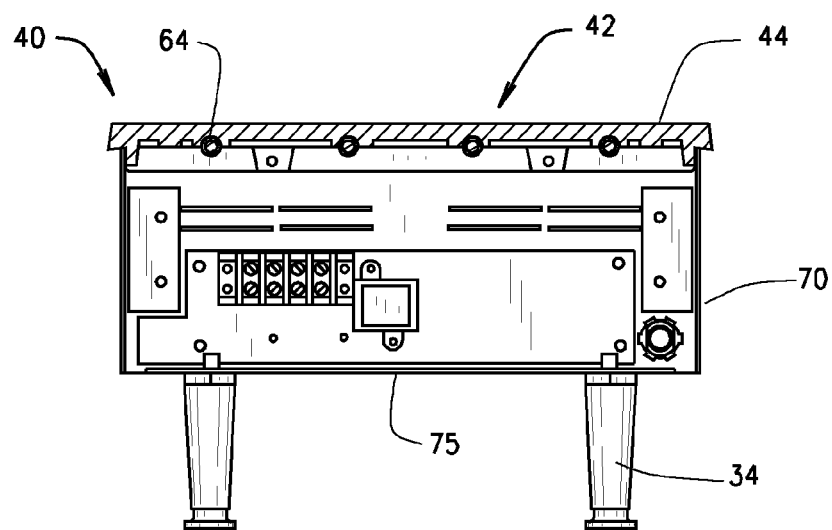
FIG. 5 is a section view of the food cooking grill along A-A of FIG. 3.

The lower platen cooking surface 44 is generally planar and in thermal communication with a lower heating element 64 that is positioned generally underneath the lower cooking surface 44 (FIGS. 1-3). The arrangement of the base housing 32, lower platen ensemble 40 and its heating element 64 and its associated insulation panels can be such as that shown in U.S. Pat. No. 6,257,126, which patent is incorporated by reference herein. The base housing 32 includes a bottom panel 75 supported by the legs 34 with side panels 70, a rear panel 72, and a front control panel 74 extending generally upward from the bottom panel 75 (FIGS. 1-5).

The lower heating element 64 is operatively connected to the control panel 74 so that an operator can regulate the temperature of the lower heating elements 64 and, in turn, the temperature of the lower cooking surface 44, in the same fashion as shown in said U.S. Pat. No. 6,257,126. A trough 77 at the front portion of the lower platen 42 is positioned to receive grease and other waste from the lower cooking surface 44 during operation (FIG. 1). To aid the drainage of grease and other waste, the lower platen 42 can slope towards the trough 77.

Figure 6:
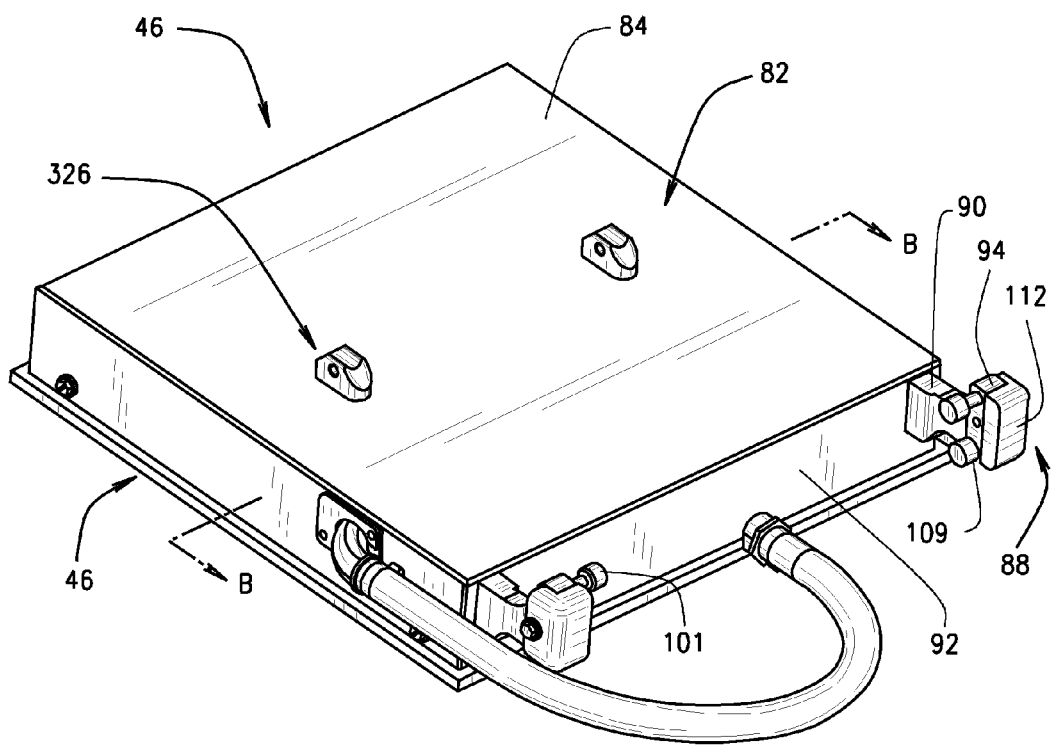
FIG. 6 is a rear isometric view of a upper platen of the food cooking grill.
Figure 7:
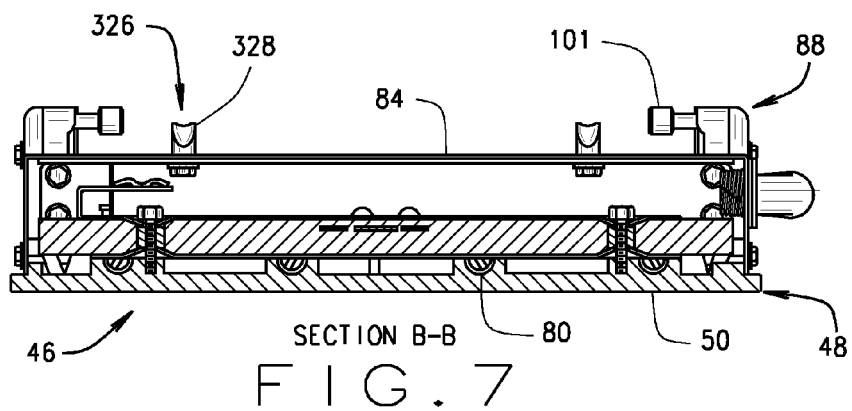
FIG. 7 is a section view of the upper platen ensemble along B-B of FIG. 6.

The upper platen cooking surface 50 is sized and shaped to correspond with the size and shape of the lower platen cooking surface 44 (FIGS. 1, and 6-7). An upper heating element 80 is positioned in thermal communication with and above the upper platen cooking surface 50. The arrangement of the upper heating element 80 and its associated insulation panel and casing 82 can be such as that shown in U.S. Pat. No. 6,257,126. The upper heating element 80 operatively connects to the control panel 74 so that an operator can regulate the temperature of the upper heating elements and, in turn, the temperature of the upper platen cooking surface 50. The casing 82 attaches to the backside of the upper platen 48 to cover the upper heating elements 80. Casing 82 has an upper wall 84.

The lower platen 42 and upper platen 48 can be of construction such as disclosed in U.S. Pat. No. 6,257,126. Platens 16 and 18 are preferably formed from a metal, such as an #319 aluminum alloy or cast iron #25, but can also be formed from any suitable heat-conducting material, such as other types of aluminum alloy, other types of cast iron, steel, ceramic, and the like. Although the lower platen 42 and upper platen 48 of FIGS. 1-16 are shown as generally rectangular, they can embody a variety of different sizes and shapes, including, but not limited to oval, circular, obround, square, polygonal, and the like.

The guidance assembly 53 includes a cam and cam follower arrangement for controlling the orientation and position of the upper platen ensemble 46 relative to the lower platen ensemble 40 and base 32. Assembly 53 comprises a pair of roller guide brackets 88, an isolated view of one bracket 88 being shown in FIG. 9. Each bracket 88 has a leg section 90 whose proximal end has bores that receive screws to secure it to rear casing wall 92. The leg section 90 extends rearwardly to join a unitary vertically extending distal toe segment 94. Toe 94 has an inside surface 97 with an upper threaded bore which receives the threaded end of a shaft 99. An upper roller 101 is rotatably mounted on the outer end of shaft 99. Each toe 94 has a recessed section 103. Section 103 has a surface 105 with a threaded bore that receives the threaded end of a shaft 107 upon whose outer end is rotatably mounted a lower roller 109. The upper roller 101 is positioned farther inwardly than is the lower roller 109. The rollers 101 can be of steel, as can shafts 99 and 107.

A separate end cover 112, which can be of plastic such as polyoxymethylene (POM) such as sold under the trademark DELRIN®, or the like, is secured about the outer two walls of toe 94 as by a screw. (FIGS. 6 and 9) End cover 112 dampens sound during operation. If desired, the material of cover 112 can be metal and of one piece with leg 90 and toe 94, without the dampening characteristics of the plastic cover 112. The brackets 88 and mounted rollers 101 and 109 make up cam followers which interact with the cam surfaces of guide supports 115, as will be described.

Figure 10:
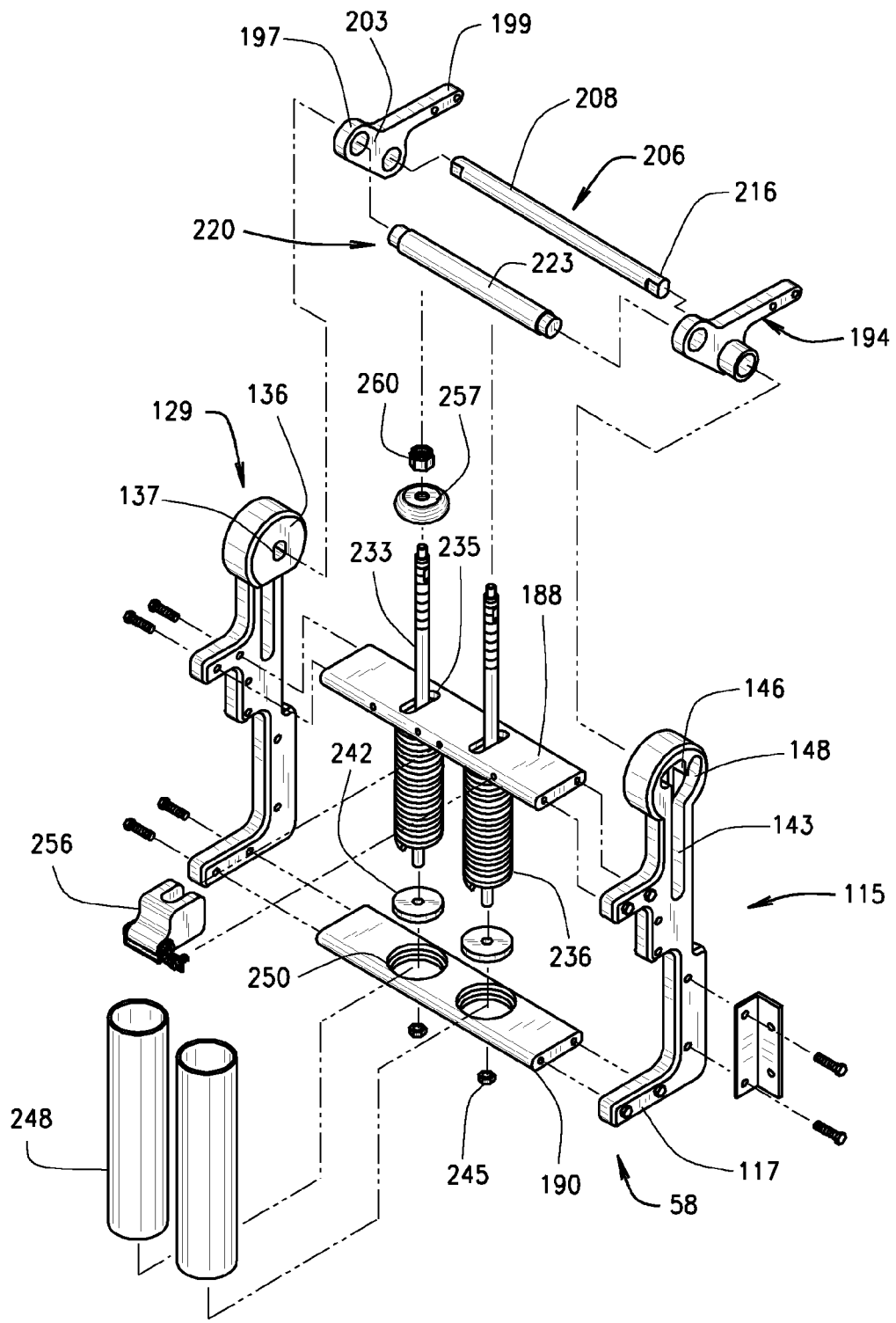
FIG. 10 is an exploded isometric view of the counterbalance assembly.

Each guide support 115 is mounted to the rear panel 72 of the housing 32 as by angle brackets and bolts (FIGS. 1, 10-12). Each support 115 provides internal cam surfaces for guiding the rollers 101 and 109 to follow. Each support 115 includes a lower foot brace 117 and a shorter upper arm 119 for supporting spring mount plates to be described. Foot brace 117 extends upwardly into a leg section 122, which thence continues into a midsection 124. Midsection 124 continues into the arm 119. Midsection 124 also further extends into an elongated neck section 126. At its upper end, neck 126 continues into a head section 129 which is generally circular with a flat bottom wall 131 for its inner side. As seen in FIGS. 10 and 12, the head 129 is thicker than the rest of the support 115. Each support 115 has an inside surface 133 and an outside surface 134. The outside surface 134 is generally flat but has grooves as will be described. The inside support surface 133 has a first area 135 that is generally flat and extends from the bottom of the support 115 to the beginning of the head 129, and a second area 136 that is on the inside surface of the head 129. The inside head surface 136 has a closed ended bore 137 extending through it into the head 129. Each bore 137 receives an end of a through-shaft to be described.

The outer surface 134 of each support 115 has a groove arrangement 140 for receiving the offset rollers 101 and 109 of the guide brackets 88 (FIGS. 11-12). The groove arrangement 140 is sized and shaped to guide the offset rollers 101 and 109 and the upper platen ensemble 46 between the cooking position (FIG. 13), the transition stage (e.g., FIG. 14), a raised position such as beneath a shelf (FIG. 15), the FIG. 16 position, and the generally vertical raised position of FIG. 18. With attention to FIGS. 11, 12 and 19, the groove arrangement 140 has a partially open sided trunk portion 143, and two branch portions 146 and 148 which are closed on one side. The bottom 149 of each trunk groove 143 has a generally semi-circular shape of slightly larger diameter than that of the lower roller 109. Therefrom the trunk groove 143 continues upwardly into a generally vertical linear groove segment 150. A recessed horizontal wall 151 is located at the upper end of trunk groove 150. The lower outside corner of wall 151 can be chamfered to facilitate ease of receiving the upper roller 101. Trunk groove segment 150 from its bottom end 149 to the end of wall 151 extends transversely completely thorough the support 115 so as to open through both the inside and outside support surfaces 133 and 134.

The trunk groove 143 continues upwardly from the edge of wall 151 into a coextensive and aligned trunk segment 152. Trunk groove segment 152 is closed sided on the surface 136 of the support head 129. Trunk groove segment 152 extends upwardly to intersect groove branch 146. At the intersection of trunk groove segment 152 and groove branch 146, the top of the left side of trunk segment 152 (from the view of FIG. 11) curves rearward into a bend 153. The bend 153 begins at the mouth of first groove branch 146. First groove branch 146 is closed sided on the surface 136 of the support head 129 and has the same depth as trunk groove segment 152. Bend 153 thence extends into a rounded first groove branch portion 154. Rounded groove portion 154 has a diameter slightly larger that the diameter of upper roller 101 so that roller 101 can seat therein with a generally flush fit but not so tight as to be binding. From rounded portion 154 the first groove branch 146 extends upwardly and forwardly into an inclined curved wall 155. Wall 155 extends into another rounded segment 157 of the first groove branch 146. The rounded segment 157 generally conforms to the outer circumference of upper roller 101. Segment 157 curves downwardly into an upper vertical sidewall segment 159, the bottom of which is at the bottom of the first groove branch 146. Sidewall 159 is generally in alignment with the forward sidewall 161 (to the right of FIG. 11) of trunk groove segment 150. The rounded segment 157, the wall 155 and the rounded portion 154 of first groove branch 146 groove branch thus provide a cam surface for the first roller 101 to guide it and thus control the orientation and position of upper platen ensemble 46 relative to the base 32 and lower platen ensemble 40 and also with rounded portion 154 to limit further movement of roller 101.

For purposes of disclosing a preferred embodiment but without limitation, the bend 153 can have a radius of curvature of about 0.125 in., the radius of curvature of rounded portion 154 can be about 0.265 in., the radius of curvature of inclined curve wall 155 can be about 0.944 in., and the radius of curvature of rounded segment 157 can be about 0.265 in.

The second groove branch 148 intersects trunk segment 152. Second groove branch 148 is closed to the support head surface 136. As discussed above, the depth of trunk segment 152 is coextensive with the depth of first groove branch 146. As shown in FIG. 19, the first groove branch 146 (as well as trunk groove segment 152) extends deeper into support 115 than does second groove branch 148. Second groove branch 148 is shaped to rollably receive the lower roller 109. Extending from trunk groove segment 152, the second branch 148 has a wall with a bend 166, and then has a portion 168 that extends at an angle of about 45°, which thence extends into a curved section 170. Section 170 generally curves forwardly and upwardly into a generally semicircular end section 173 of a slightly larger diameter than that of lower roller 109. The rearward end of semicircular section 173 extends downwardly and rearwardly into a wall 175. A finger-shaped barrier 178 having an end 180, is formed between the wall 175 and the upper side wall segment 159 of first branch 146. The semicircular section 173 and wall 175 of the barrier 178 limits movement of upper roller 101 into the second branch 148 and of lower roller 109 into the first branch 146, as well as stopping movement of lower roller 109. The bend 166, wall portion 168 and curved section 170 and end section 173 of groove branch 148 thus provide a cam surface for the second roller 109 to control the orientation and position of upper platen ensemble 46 relative to the base 32 and lower platen ensemble 40.

The offsetting of the depth of second groove branch 148 with the depths of the trunk groove segment 152 and its coextensive depthed first groove branch 146, and the offsetting of the extensions of the corresponding rollers 101 and 109, thus prevents misdirection of upper roller 101 into second branch 148. The trunk groove portion 150 has been described as preferably open from one side to the other, as that design facilitates cleaning of the area about it. However, the trunk groove portion 150 can be closed to the side along support surface 135 to be for example, of the same depth as trunk groove segment 152 and first groove branch 146.

The preferred embodiment illustrates the trunk groove segment 150 with support 115 structure illustrated as surrounding groove segment 150. However, the space shown as occupied to the right of trunk groove segment 150 can be open from the bottom end 149 of trunk groove 150 to approximately the beginning of the bend 168 leading in to the second grove branch 148. In that modification, the wall 161 to the right of trunk groove segment 150 would be eliminated so that the space to the right of groove segment 150 in FIG. 11 would be open. The rollers 101 and 109 in such a modification would travel along what is shown as the left wall of groove segment 150 in FIG. 11. More structural material could be used to widen the part of the support 115 in the area that is shown to the left of groove segment 150 in FIG. 11.

Likewise, in another modification the part of the support 115 to the left of groove segment 150 could be removed to open to the left in FIG. 11, with the part of the support 115 along what is shown as the right sidewall 161 being widened to provide more structural support. However, it is preferred to have the embodiment shown in the drawings to have greater structural integrity for the guide support 115 and groove segment 150 wall surfaces on both sides of the rollers 101 and 109 as they travel through trunk segment 150 and as they enter trunk groove segment 152, and as lower roller 109 enters the second groove branch 148.

For purposes of disclosing a preferred embodiment, but without limitation, as to the second branch 148 the bend 166 can have a radius of curvature of about 0.250 in., the curved section 170 can have a radius of curvature of about 0.515 in., the semicircular end section 173 can have a radius of curvature of about 0.53 in., the angle of wall to the vertical is about 15° and the barrier end 180 can have a radius of curvature of about 0.060 in.

For purposes of disclosing a preferred embodiment, but without limitation, the rollers 101 and 109 for the aforesaid preferred embodiment dimensions described for groove arrangement 140 are preferably of the same diameter which can be about 0.5 inch, with the axes of the rollers 101 and 109 being about 1.25 inches from each other. This arrangement allows the rollers 101 and 109 to orbit more or less within the groove arrangement 140 as the upper platen ensemble 46 pivots upwardly and counterclockwise.

An upper spring mount plate 188 and lower spring mount plate 190 are attached at each of their two ends, respectively, to the upper arms 119 and lower feet 117 of supports 115, as by a pair of screws.

The counterbalance assembly 54 further comprises a pair of pivotal force transmission members 194 for transmitting force to and from the handle assembly 52, and to and from the biasing assembly 58, and for allowing the handle assembly 52 along with the aforesaid cam surfaces and structure of guide supports 115 to direct movement of the rollers 101 and 109, one member 194 being shown isolated in FIG. 21. Each force member 194 has a rearwardly extending thumb 197, a forwardly extending finger 199, and therebetween a middle palm area 203. To pivotally mount the force member 194 to the supports 115, a transverse through-shaft 206 is provided (See FIG. 10). Through-shaft 206 is preferably of one piece unitary construction, and can be of metal such as stainless steel, for example. Through-shaft 206 has a cylindrical midsection 208 which extends through bearings 210, preferably needle bearings, mounted in bores of the palm area 203 and coextensive with a sleeve 212 of member 194, so that the force member 194 can rotate relative to the shaft 206. The ends 216 of the through-shaft 206 are shaped to fit into the conforming bores 137 on the inside surfaces of the heads 129 of each support 115. In the embodiment shown, the shaft ends 216 have generally flat sides and the support bores 137 have matching and abutting sides to prevent shaft rotation. If desired the shaft ends 216 can have the shape of a double "D" bore, with the upper sides of slightly convex, and tabs projecting from the corners, with the bores 213 having a conforming shape.

A crossbar 220, seen isolated in FIGS. 22-23, is connected at each of its ends to a corresponding force member 194. Crossbar 220 is preferably a single unitary rod having a solid cylindrical midsection 223 that extends toward each of its ends into an annular shoulder 225, and thence extends into cylindrical ends 227 of reduced diameter. Each of the force member thumbs 197 has a cylindrical bore that houses a needle bearing 230 which receives as by a sliding fit a corresponding crossbar end 227.

To assist in transmitting force to and from the force members 194 and the biasing assembly 58, the biasing assembly 58 has guide rods 233. Each guide rod 233 is associated with a biasing member 236, shown in the preferred embodiment as a helical compression spring. The crossbar 220 has a pair of transverse threaded bores 238 that each receives the threaded upper end 240 of a corresponding rod 233. Each rod 233 extends downwardly therefrom through a corresponding obround hole 235 in mount plate 188, thence through the center of its corresponding spring 236. Thence each rod 233 extends through a retaining washer 242 located beneath spring 236. A nut 245 is secured about the rod's threaded lower end 248 beneath washer 242 to sandwich the washer 242 between the nut 245 and lower end of spring 236.

A cylindrical cover 248, which can be of plastic such as polyoxymethylene (POM) such as sold under the trademark DELRIN®, or the like, encloses a corresponding spring 236 and washer 242. The lower end of each cover 248 seats upon the shoulder of an annular offset bore 250 in the top side of lower mount plate 190, to be supported thereby. The underside of upper mount plate 188 likewise has an annular recess about the obround hole 235, with a shoulder that seats the upper end of cover 248 to resist upper movement of cover 248. The inside diameter of the cover 248 is preferably slightly larger than the outside diameter of spring 236 when the spring 236 is in the compressed position. When a spring 236 is compressed, its diameter expands so that its companion cylindrical cover 248, by virtue of the snug fit of the interior surface of the cylindrical cover 248 about the outside of the spring 236, acts through the cover's tensile force resistance to help keep the spring 236 from buckling. A flat cover plate 251 which can be of metal, is secured to the central bottom side of lower mount plate 190 as by screws, to close the bottom of its bores 250.

The grill assembly 30 can further comprise the stop assembly 60, which generally comprises a pivoting stop block 256, a disc stop 257 and a retaining nut 260, which interact with components of the counterbalance assembly 54. (See FIGS. 1-4, 10 and isolated exploded view of FIG. 18). The stop assembly 60 functions in situations where the grill assembly 30 is located beneath a shelf or other overhanging structure having a height low enough to make it desirable to keep it from being bumped by the handle assembly 52 and/or upper platen ensemble 46 during their upward movement.

More particularly, the stop block 256 can be made of plastic or rubber-like material. The stop block 256 has a larger generally rectangular front section 262 that, from the perspective of its upright position of FIGS. 1, 3, 10 and 20, has a vertically extending U-shaped slot 265 therethrough. The stop block 256 further has a lower and smaller rearwardly extending projection 267. Projection 267 has a curved outer surface, which preferably is of the semicircular shape shown in the drawings, which facilitates smooth pivotal movement when the block 256 rotates as will be described. The projection 267 has a transverse bore 270 therethrough for rotationally receiving a pivoting pin, shown as clevis pin 272. The closed end 275 of slot 265 is of generally a semicircular shape with a radius that is slightly larger than that of the rods 233. The width of slot 265 is slightly larger than the diameter of the corresponding rod 233, so that rod 233 can slide through slot 265 as rod 233 moves up and down and to-and-fro with the crossbar 220.

As seen best in FIG. 18, a block mounting bracket 278 has a lower flange 280 that extends upwardly and at a right angle into a U-shaped flange 282. The lower flange 278 has a bore 284 at either end. Machine screws 286 extend through bores 284 and are received by threaded bores in the rear edge of upper mount plate 188, to thus secure bracket 278 to plate 188. The U-shaped flange 282 has a pair of upright ears 289 at its ends. Ears 289 each have a bore 290. The clevis pin 272 extends though those ear bores 290 and through the transverse bore 270 of block projection 267. Pin 272 is pivotally secured thereto by a retaining ring 293 shown in the drawings as an E-ring, or other known snap ring, which fits into an annular retaining groove at the end of the pin 272.

The bottom surface of stop block 256 which lies beneath the front block section 262 and beneath the smaller projection 267 is substantially flat so that it fits flush against the top surface of mount plate 188 when the block 256 is in its fully pivoted clockwise position from the vantage of FIGS. 1, 3, 13 and 14. When an overhanging structure does not render a need for it, the block 256 can be pivoted counterclockwise to no longer overlie plate 188, such as shown in FIG. 16.

The stop disc 257 of stop assembly 254 can be of plastic such as polyoxymethylene (POM) such as sold under the trademark DELRIN®, or the like. Disc 257 has an annular shape with a curved outer rim 295, which can be a generally semicircular cross-section. Disc 257 has a central threaded bore that can screw upwardly and downwardly on the threaded upper guide rod end 300 so that it can be positioned in a desired location. In the drawings the stop assembly 60 is shown to the right side of the mount plate 188 when viewed looking at FIGS. 1 and 4, though it may just as easily be on the left side.

The nut 260 can be screwed upon the rod 233 to be positioned with its bottom resting against the top of disc 257 when disc 257 is screwed to its chosen position. As the crossbar 220 pushes the rod 233 downwardly, the disc 257 engages the upper surface of the block 256 to prevent further upper movement of the handle assembly 52 and upper platen ensemble 46.

When block 256 is in its non-operable position of FIG. 16, the upper platen ensemble 46 can be moved to the FIG. 16 position wherein the disc 257 is positioned as shown. When moved to the FIG. 18 position, the disc 257 itself engages the top surface of plate 188 as shown, to limit the counterclockwise rotational movement of the upper platen ensemble 46 and of the handle assembly 52.

If desired, the grill assembly can be provided without the stop assembly 254.

Figure 8:
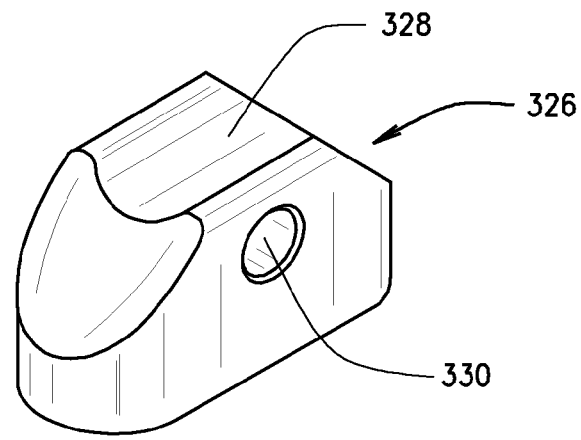
FIG. 8 is an isometric view of an upper platen ensemble bracket.
Figure 9:
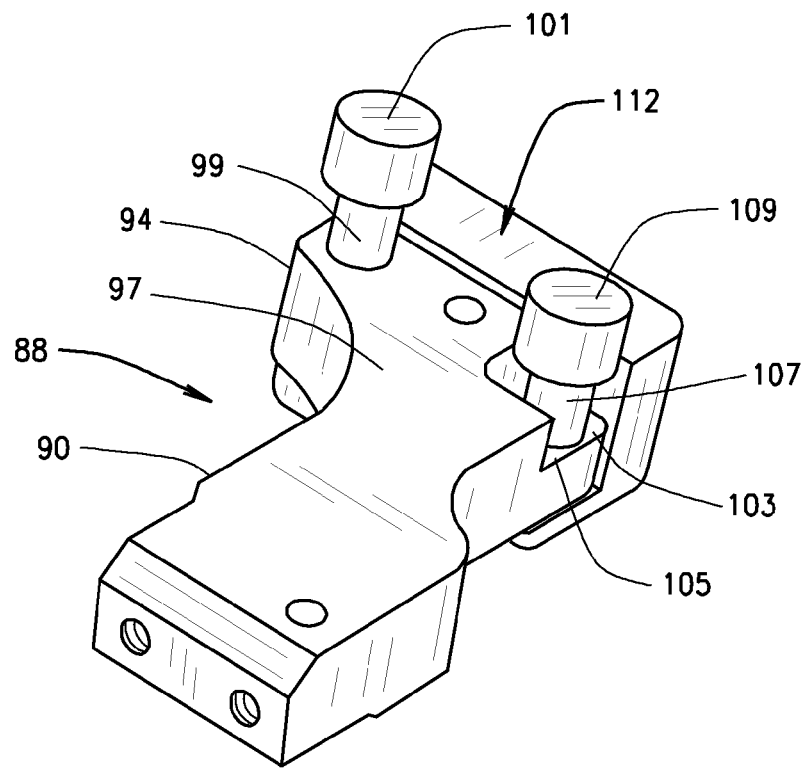
FIG. 9 is an isometric view of a roller mounting bracket.

The handle assembly 52 has a pair of angled arms 302 that have a handle grip 304 attached at their distal ends (FIG. 1). Each of the proximal ends 307 of the arms 302 are flattened and secured by a pair of screws toward the end of the force member fingers 199. From ends 307, each handle arm 302 has a section 310 that generally extends downwardly to a lower junction bend 312 and then bends upwardly into another section 315 so that sections 310 and 315 and junction 312 form a generally wide "V" shape. Each arm section 315 has a bore near junction 312 that receives a pin 318. Pin 318 extends through openings in the upper ends of a pair of inner and outer links 322. Handle mount members 326 are secured to the top of the casing 60 as by screws. An isolated view of a mount member 326 is shown in FIG. 8. The members 326 have an upper concave groove 328 with a curvature that conforms to the curvature of the handle arm sections 310 and 315 to receive same. Each mount member 326 has a transverse bore 330 extending therethrough. A pin 333, such as a clevis pin, extends through the openings at the lower end of the links 322 through the mount member bore 330 to pivotally mount the handle arms 302 to the mounts 326. As seen in the drawings such as FIGS. 1, 3 and 13-18, the pivoting of the links 322 relative to the handle arms 302 and mounts 326 allows the upper platen ensemble 46 to maintain a horizontal position with its cooking surface 50 generally horizontal to the lower platen cooking surface 44 when the cooking surfaces 44 and 50 are within a range of about 3 inches apart. This feature allows for even application of the upper platen cooking surface 50 upon a variety of foods of different thicknesses when the upper platen cooking surface 50 is moved downwardly upon the food to engage it.

As is known in the art, if desired, burn guards can be placed on the casings for the upper platen and for the upper platens in the split platen design.

In operation, the biasing assembly 58 exerts a downward force on the crossbar 220, which through force members 194 translates to exerting an upward force on the upper platen ensemble 46 (FIG. 1). That force from the biasing assembly 58 acts in opposition to the weight of the upper platen ensemble 46 so that when the operator uses the handle assembly 52 to move the upper platen ensemble 46 to a certain position, and then releases the handle assembly 52, the biasing assembly 58 holds the upper platen ensemble 46 in that position. Also, the upward force of the biasing assembly 58 reduces the force applied by the weight of the upper platen ensemble 46, which allows the operator to use less force to move the upper platen ensemble 46 between positions.

The operator can engage and move the handle grip 304 to move the upper platen ensemble 46 to desired positions as described. Starting from a position of FIG. 13 wherein the lower roller 109 abuts the end of trunk groove end 149, as the upper platen ensemble 46 is raised, the rollers 101 and 109 move vertically upwardly through trunk groove segments 150 and 152 with the upper roller 101 traveling vertically therethrough to enter the first groove branch 146. In the embodiment shown, this will be a distance of about three (3) inches. The upper roller 101 travels to reach the curved end 157 of branch 146. Upper roller 101 is then guided by the aforesaid cam interaction to roll against the inclined curved wall 155 through groove branch 146 until it is received within rounded end portion 154. As roller 101 begins rolling along curved wall 155, the lower roller 109 enters second branch 148 and begins rolling upon wall portion 168 to go through the aforesaid cam interaction. As platen ensemble 46 pivots and upper roller 101 traverses its wall 155, the lower roller 109 rolls along curved section 170, and as it does so, the platen ensemble 46 continues to pivot in a generally counterclockwise direction from the view of FIGS. 13-18. When the upper roller 101 first arrives to be within the rounded end segment 157, the lower roller 109 is rolling upon the curved section 170 at a point at about 52° relative to a horizontal plane. When the lower roller 109 rests within end section 173 of branch 148, the upper roller 101 is still positioned within the rounded end segment 157 of first branch 146, and the upper platen surface 50 is approximately in the vertical position of FIG. 18.

Figure 13:
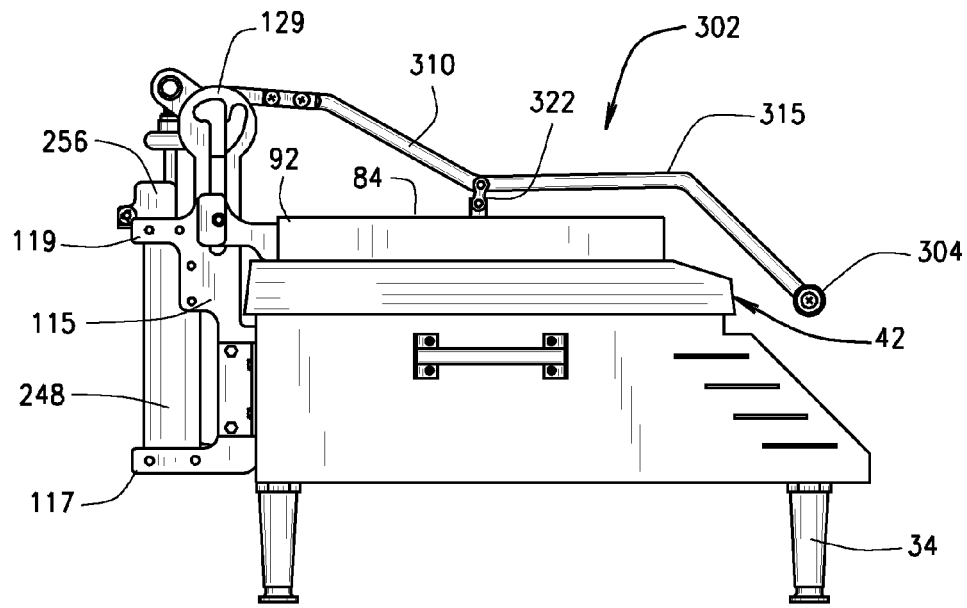
FIG. 13 is a side elevation view of the food grill with the upper platen shown at a point in a closed position.
Figure 14:
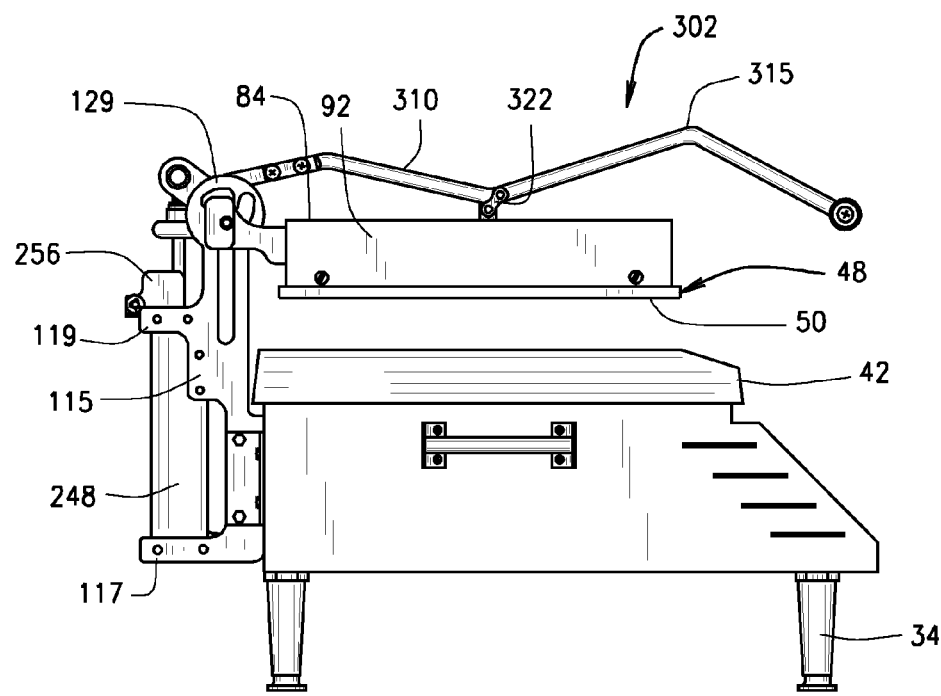
FIG. 14 is a side elevation view of the food grill with the upper platen in a raised position.

From the vertical position of FIG. 18, the upper platen ensemble 46 can be moved to the lower position of FIG. 13 by moving the handle 304 downward. The lower roller 109 then travels downward through second branch 148 and its cam surfaces, reversing its aforesaid path upward. As roller 109 reaches about the 52° point, the roller 101 moves out of rounded segment 157 and moves across the first groove branch 146 and its cam surfaces and reverses its aforesaid path. The rollers 101 and 109 then travel downward vertically through trunk groove 143 until the bottom roller 109 rests against the bottom curved end 149 of trunk 143. In that position the upper platen cooking surface 50 is in proximity with the lower platen cooking surface 44, so as to be in contact therewith or spaced a short distance therefrom, preferably such as between about 0.1 inch and about 0.25 inch.

The washers 242 and nuts 245 are adjustable along the spring guide rods 233 to allow for adjusting and setting the amount of tension on the springs 236, which in turn regulates the amount of biasing force applied to the upper platen ensemble 46 (FIG. 10). This allows the operator to adjust and set the biasing force on the upper platen ensemble 46 for individualized applications. Typically, the adjustment is set so that for any position to which the upper platen ensemble 46 is selected to be moved, the biasing will be such as to maintain the upper platen ensemble 46 in that selected position.

When the upper platen ensemble 46 is in the vertical position of FIG. 18, the upper platen cooking surface 50 is generally perpendicular to the lower platen cooking surface 44, and the upper surface 50 is positioned forwardly of the rear of the lower platen 42. Hence grease dripping downwardly from the upper platen surface 50 will stay within the lower platen 42 and not spill out to the counter or other surface upon which the grill assembly 30 rests. Also, as exemplified in FIGS. 3 and 13-16, through the transition position of the upper platen ensemble 46 the upper platen surface 50 stays over the lower platen 42 throughout the movement so that grease that drips from the upper platen 48 will not spill but will drip on to the lower platen 42. In the present grill, it is not necessary to provide the separate stop or catch rod 403 of the grill of the said U.S. Pat. No. 6,257,126, to keep the lower end of the upper platen 48 from extending from beyond the rear of the lower platen 42. This is because groove arrangement 140 of the supports 115 and the structure and operation of the counterbalance assembly 20 act to keep the rear edge of upper platen 18 in front of the rear edge of the surface of lower platen 16 at all times.

The present linkage of the handle arms 302 to the upper platen ensemble 46 allows that during movement of the upper platen ensemble 46 from the closed position through the approximately first three inches of upward movement of the upper platen cooking surface 50, that surface 50 remains approximately parallel to the lower platen surface 44, unlike the tilted relationship of the upper platen surface position in U.S. Pat. No. 6,257,126. At every location of the food item on the upper platen cooking surfaces 50 and lower platen surface 44, the assembly 30 provides for a uniform contact from front to rear, and from side to side of the upper platen surface 50 with the food items placed on the lower platen surface 44.

The stop assembly 60 can be operated in the manner described to position the block 256 to limit the upward pivotal movement of upper platen ensemble 46 so that it does not strike structures there above. In the upright position of block 256 of FIGS. 1-4 and 13-16, during the to-and-fro sliding of the corresponding rod 233 through the slot 265 and as can be seen from the different positions of the corresponding rod in FIGS. 3, 13, 14 and 15, during such movement, rod 233 preferably stays within the sidewalls of the slot 265 with the forward edge of the rod preferably not extending beyond the proximal opening of slot 265 and its surrounding block structure.

The open accessibility to the counterbalance assembly 54, the supports 115, force members 194, crossbar 220, throughshaft 206 and handle assembly 52 allows for easy replacement of their components and their easy servicing. The counterbalance assembly 54 including its supports 115 can be serviced without having to turn the unit upside down, as with the grill and counterbalance assembly shown in U.S. Pat. No. 6,257,126. Additionally, all of the parts of the counterbalance assembly 54 can be individually replaced, in contrast to the design of U.S. Pat. No. 6,257,126 wherein the entire counterbalance assembly must be replaced. This reduces part, replacement costs and costs with the new design.

In the counterbalance assembly 54 and the supports 115 there is no equivalent to the cams present in U.S. Pat. No. 6,257,126 to wear. Hence, the design avoids the potential for wear and tear of the cams previously discussed for the aforesaid U.S. Pat. No. 6,257,126 disclosure.

The needle bearings provide for smooth operation and long life of the unit.

The invention can be used with a split upper platen arrangement such as the split upper platen shown and discussed in FIG. 20 of the said incorporated by reference U.S. Pat. No. 6,257,126, wherein two separate upper platen ensembles 43a' and 43b' were disclosed in connection with a lower platen ensemble 40' and its base housing 32'.

With assembly 30' of U.S. Pat. No. 6,257,126, the two upper platen ensembles 43a' and 43b' are operable so that the lower surfaces 291a' and 291b' of the upper platen ensemble 43a' and 43b' respectively, can be lowered upon food placed on the lower surface 159' of the lower platen ensemble 40'.

Figure 25:
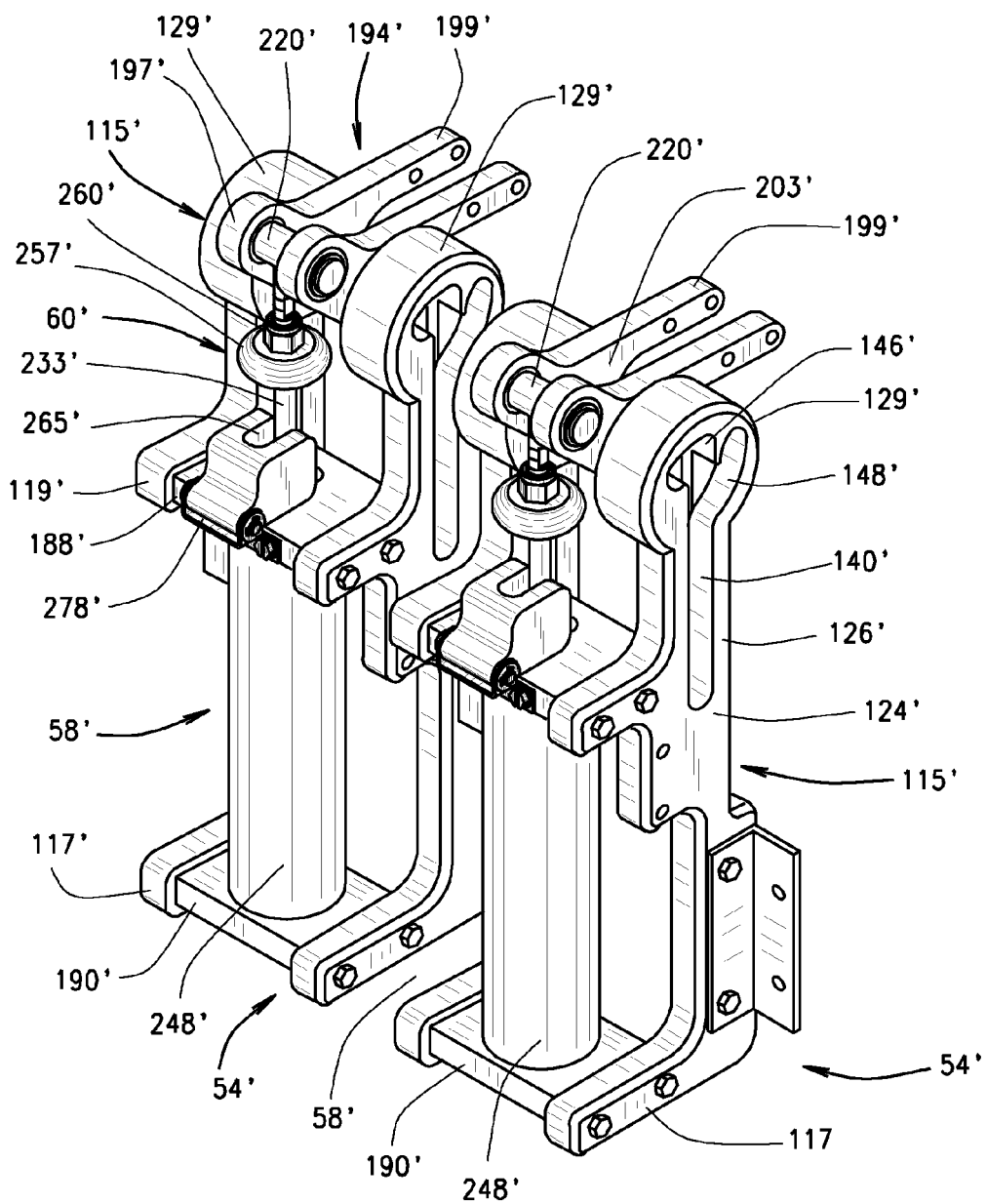
FIG. 25 is a rear isometric view of the dual counterbalance assembly for a split-upper platen ensemble.
Figure 26:
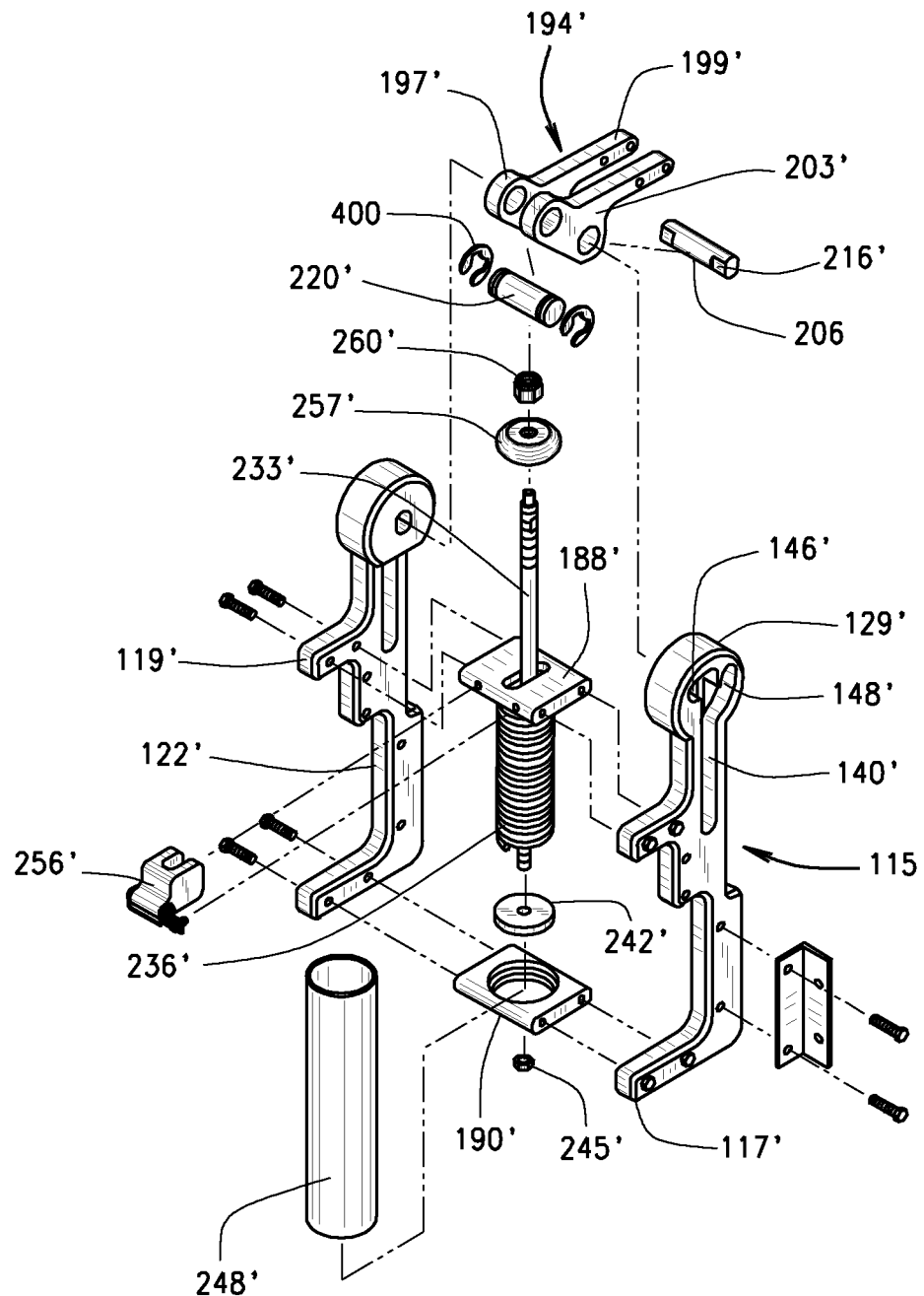
FIG. 26 is an exploded isometric view of the split-counterbalance assembly of FIG. 25.
Figure 29:
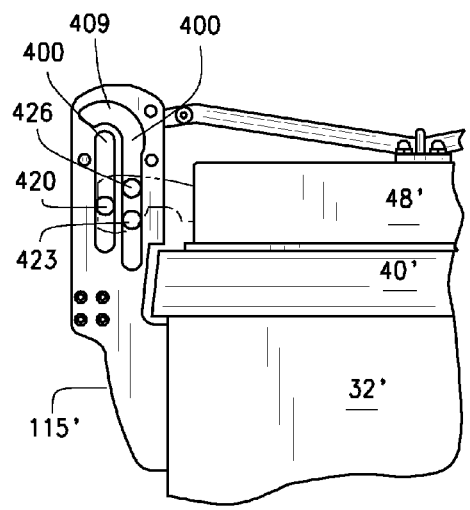
FIG. 29 is a side elevation view of the counterbalance assembly and guidance assembly of FIG. 28 with the upper platen shown at a point in a closed position.
Figure 30:
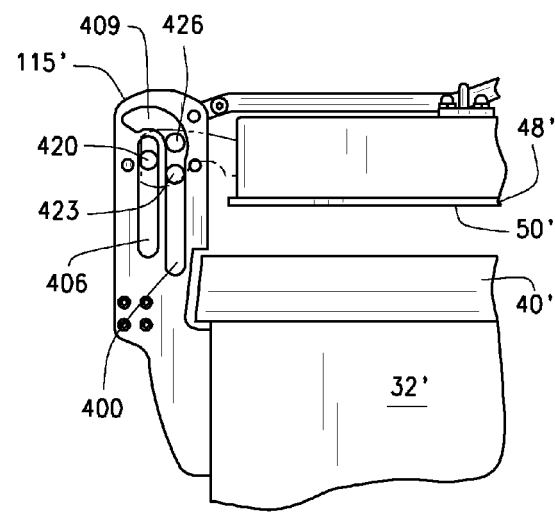
FIG. 30 is a side elevation view of the counterbalance assembly and guidance assembly of FIG. 28 with the upper platen in a raised position.
Figure 31:
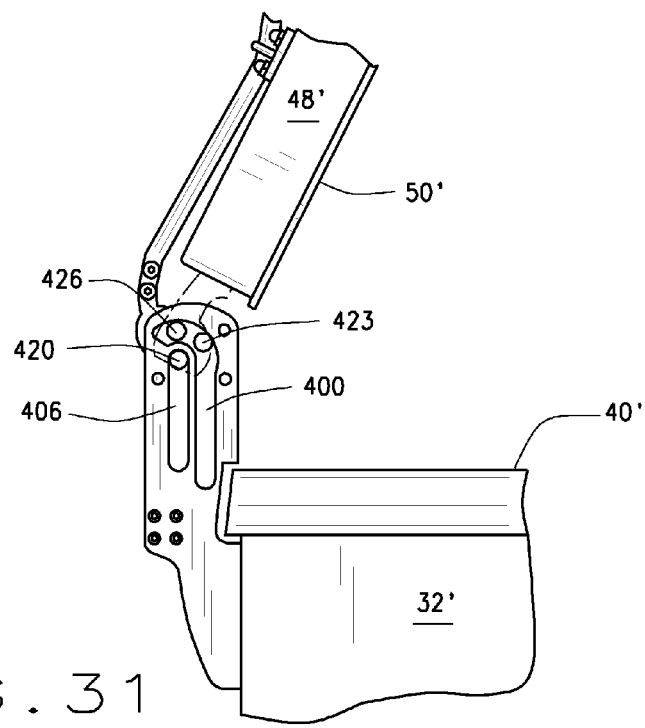
FIG. 31 is a side elevation view of the counterbalance assembly and guidance assembly of FIG. 28 with the upper platen in an open position.
Figure 32:
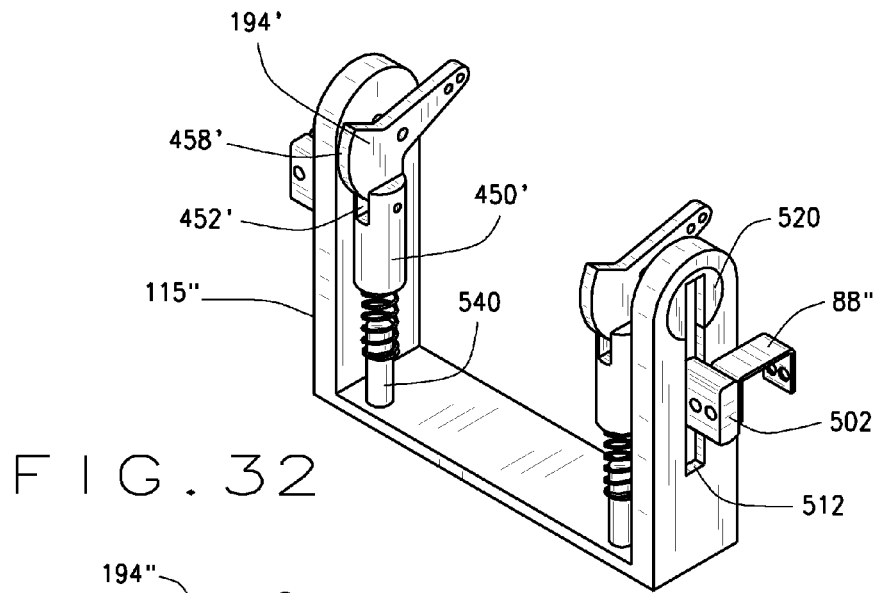
FIG. 32 is an isometric view of yet another embodiment of the counterbalance assembly and guidance assembly.
Figure 33:
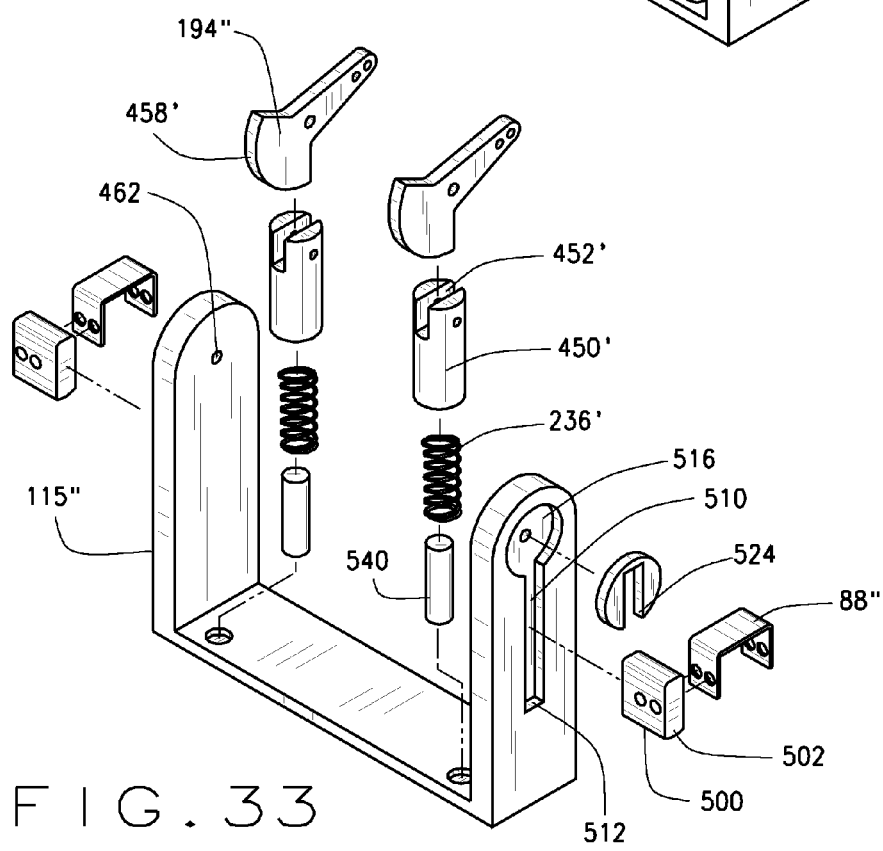
FIG. 33 is an exploded isometric view of the counterbalance assembly and guidance assembly of FIG. 32.
Figure 34:
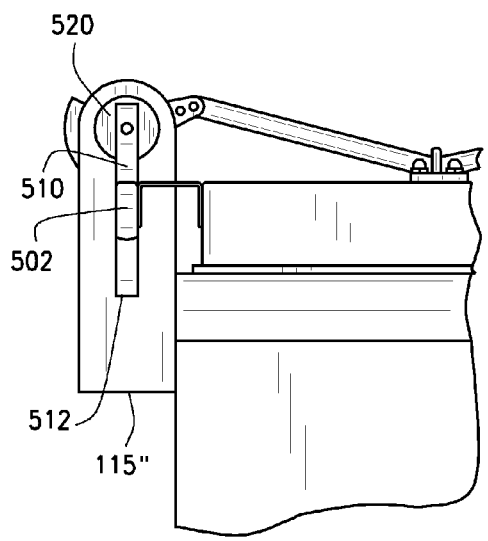
FIG. 34 is a side elevation view of the counterbalance assembly and guidance assembly of FIG. 32 with the upper platen shown at a point in a closed position.
Figure 35:
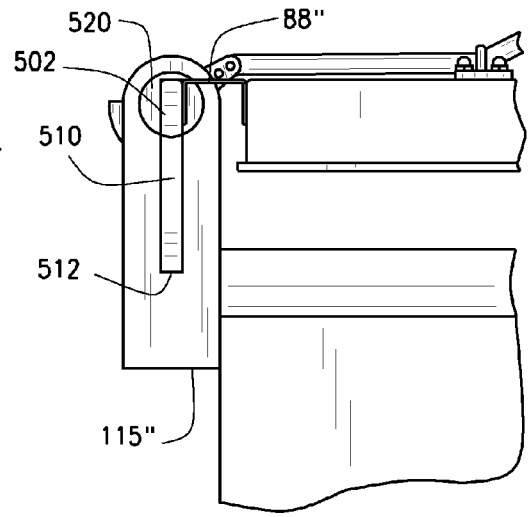
FIG. 35 is a side elevation view of the counterbalance assembly and guidance assembly of FIG. 32 with the upper platen in a raised position.
Figure 36:
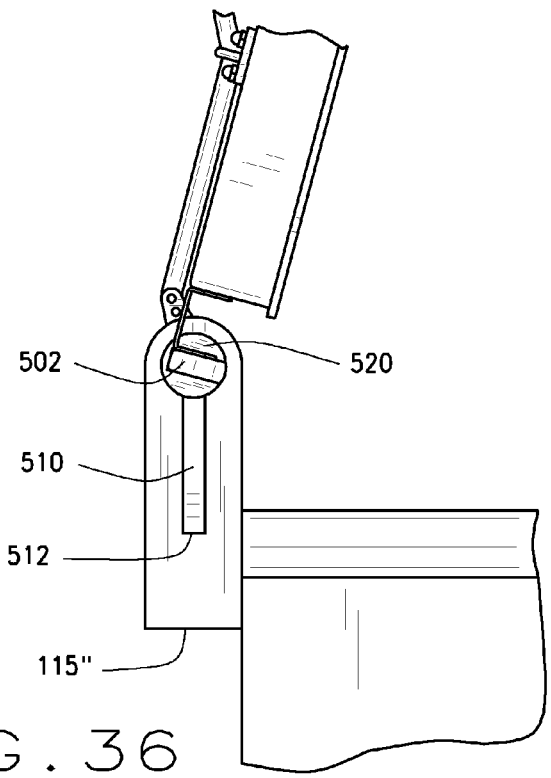
FIG. 36 is a side elevation view of the counterbalance assembly and guidance assembly of FIG. 32 with the upper platen in an open position.

In the present invention, FIGS. 25 and 26 show parts of a split or double platen food cooking assembly for use with a lower platen ensemble such as described herein as ensemble 40 having its lower platen 42 with cooking surface 44. FIGS. 25 and 26 show parts of a pair of counterbalance assemblies 54', each including a biasing assembly 58' and a stop assembly 60'. The counterbalance assembly 54' includes its biasing assembly 58' and stop assembly 60'. Each assembly 54 is the same as described for counterbalance assembly 54, except there are two such assemblies 54', one to accommodate each of the split upper platen ensembles. Each of the counterbalance assemblies 54' includes a matching pair of roller guide brackets (not shown) such as the previously described brackets 88 with upper and lower roller 101 and 109. Such brackets are mounted to the rear wall of the upper platen casing 92 in the manner previously described, except two pairs are provided for each assembly 54'.

Each counterbalance assembly 54' likewise comprises a pair of supports 115' which are secured to the rear housing panel 72 as by angle brackets and bolts. Each support 115' includes a lower foot brace 117' and an upper arm 119'. Each support 115' has a groove arrangement 140' with a trunk portion 143' and branch portions 146'and 148', as described for the supports 115. The biasing assembly 58' likewise includes an upper spring mount plate 188' and a lower spring mount plate 190', secured at their ends to the corresponding upper arms 119' and lower feet 117' of corresponding supports 115'.

Each counterbalance assembly 54' further correspondingly includes a pair of force transmission members 194' with a forwardly extending finger 199' for being connected to the end of angled arms of a handle assembly, such as arms 302 of previously described handle assembly 52. Hence, each combination assembly has its own corresponding handle assembly Each of the force members 194' likewise has a thumb 197'. Each pair of force members 194' are connected by a crossbar 220'. Because of two counterbalance assemblies 54' being provided, the crossbars 220' are shown to be of much shorter length than the crossbar 220 in the described embodiment for a single upper platen. Also, in FIGS. 25 and 26, each cross bar 220' has an annular recess at each end of its ends for receiving a snap ring, such as an E-ring 400, to hold cross bar 220' to force member 194'. Each pair of the force members 194' has a through-shaft 206' that extends through the force member palm 203' with each of their shaft ends 216' secured to a corresponding support 115' head bore 137'.

Each of the biasing assemblies 58' include covers 248' for corresponding compression springs 236' the upper and lower ends of which are seated and mounted with the spring guide rods 233' and mount plates 188' and 190', in the manner previously described. However, for the FIGS. 25-26 embodiment, there is associated with each counterbalance assembly 54' a single biasing member such as a compression spring 236' and its associated cover 248'. Hence, with the described split platen assembly there in are in the FIGS. 25-26 embodiment a total of two compression springs 236' and two spring covers 248'.

There is a stop assembly 60' associated with each counterbalance assembly 54', to separately control each of the split upper platen ensembles to prevent each from striking a shelf or other overhanging structure. In FIGS. 25-26, each stop assembly 60' comprises, in a fashion previously described, a stop block 256', a disc stop 257' and a retaining nut 260'. The stop disc 257' can be adjusted as previously described to different positions along its corresponding spring support guide rod 233', to allow adjustment in stopping the corresponding upper split platen upward pivotal movement. Likewise each stop block 256' is mounted by a mounting bracket 278' to a corresponding upper mount plate 190'. Each block 256' can be pivoted counterclockwise to a position such as shown for block 256 in FIG. 16, to be out of the way when its corresponding upper platen ensemble is pivoted upwardly.

With the embodiment of FIGS. 25-26, if a service call is needed for a split platen ensemble on one side of the split platen grill assembly, repair and maintenance can be provided while the other split platen ensemble remains operational, thus eliminating downtime. The crossbars 220' increase the rigidity of the top housings of the split platen.

For the single upper platen embodiment of FIGS. 1-24, rather than having two springs 236, a single coiled spring or other type of biasing member could be located toward the center of the biasing assembly, although the two spring arrangement is preferred. In alternate embodiments, the compression springs 236 can be replaced with other appropriate biasing elements and structured to orient a biased relationship as to the upper platen ensemble 46, such as torsion springs, extension springs, conical springs, helical springs, leaf springs, spiral springs, cantilever springs, gas springs, Belleville springs and the like. However, a helical compression spring or pair of such springs such as shown are preferable because of providing better and more effective use of space, orientation, endurance, material and replacement and servicing accessibility. The compression spring arrangement is preferable for the split paten embodiment of FIGS. 25-26 as well.

Another embodiment is shown in FIGS. 27-31. In this embodiment, a pair of guide supports 115' is provided which can be mounted to the base 32' in the fashion previously described for supports 115. Supports 115' accommodate three rollers. Each support 115' has a first generally vertical groove 400 for receiving and guiding a single roller. Support 115' also has a second groove 403 which has a generally vertical segment 406 which extends upwardly into a curved segment 409 that has cam surfaces for directing the movement of a pair of rollers associated with the upper platen ensemble 46'. The ends of both grooves 400 and 403 are generally semicircular to match with the rollers' circumference such as described for the lower trunk groove end 149.

In the embodiment of FIGS. 27-31, a pair of roller guide brackets 88' are mounted to upper platen ensemble 46' as describe for brackets 88'. Three rollers 420, 423 and 426 are mounted to shafts for rotational movement relative thereto, which shafts are mounted to each bracket 88' in the manner previously described for rollers 101 and 109. However, the rollers 420, 423 and 426 are positioned to be the same distance from the bracket 88' so as to be generally aligned in the same vertical plane. The roller 420 is aligned with its corresponding support 115' to fit within the vertical groove 400 so that it rest against the semicircular lower end of groove 400 when the upper platen ensemble 46 is in its lowest position.

This FIG. 27-31 embodiment also has an upper spring mount plate 188', biasing members 236' in the form of coiled springs with their ends mounted in conforming bores on the top side of plate 188', and the upper spring ends and pivot members 454 received in compression members 450 having slots 452 that receive the lower cammed ends 458 of force transmission members 194' which rotate about rivets 460, such as with a bearing 462. The rivets 460 extend through bores in a spacer 464, a bushing 466, and the guide supports 115'. As the handle assembly lifts the upper platen ensemble 46' upwardly roller 420 travels upwardly toward its upper end as the upper platen 48' is lifted to maintain its surface 50' to be parallel to the lower platen cooking surface. Of the rollers 423 and 426, roller 423 is the lower and roller 426 is the upper roller. In the lowest position of upper platen ensemble 46', the lower roller 423 rests against the bottom semicircular end of groove segment 406. As the upper platen ensemble 46' is lifted upwardly, as roller 420 contacts the upper end of groove 400 the upper roller 426 enters curved groove segment 409 and rides along its curved upper cam surface toward the closed end of groove segment 409. Lower roller 423 follows roller 426 so that roller 423 rolls along the camming surface of curved groove segment 409. When the upper platen ensemble 46' is lowered, the rollers 420, 426 and 423 move downwardly through their respective grooves until roller 420 rests against the lower end of groove 400, and lower roller 423 rests against the lower end of groove segment 406.

The compression members 450 act to compress the biasing members 236' in the same manner as described in the preferred embodiment to act as part of the modified biasing assembly 58' and counterbalance assembly 54'.

Yet another embodiment is illustrated in FIGS. 32-36. The brackets 88" each has secured thereto a generally rectangular cam follower member 500 with a lower end 502, which can have rounded corners at both ends. The guide supports each have a vertical groove 510 which has a general flat lower end 512 with rounded corners to match the follower lower end 512.

Vertical groove 510 extends upwardly into a generally cylindrical shaped recess 516 of slightly larger diameter that the length of follower member 500. Groove 510 and recess 516 are closed to the inside of support 115". A slotted partially cylindrical piece 520 is rotatably received within recess 516 and held by any conventional means. Piece 520 has a slot 524 sized to receive the member 500.

This FIG. 32-36 embodiment also has an upper spring mount plate 188" that is a unitary piece with the supports 115". Biasing members 236" in the form of coiled springs have their ends mounted about mount posts 540 that fit in conforming bores on the top side of plate 188', and the upper spring ends are received in conforming cylindrical bores at the lower ends of compression members 450'. Compression members 450' have upper slots 452' that receive the lower cammed ends 458' of force transmission members 194" which rotate about rod (not shown) that is mounted in bores 462' of the guide supports 115".

The compression members 450' act to compress the biasing members 236" in the same manner as described in the preferred embodiment to act as part of the modified biasing assembly 58" and counterbalance assembly 54".

As the upper platen ensemble 46" is raised upwardly the lower platen surface 50" remains generally parallel with lower platen cooking surface 44 as the follower 500 passes through groove 510. Upon entry of follower 500 entirely within slot 524 the upper platen ensemble 46" pivots and follower 500 rotates there within, with the circumference of piece 520 sliding upon the circumferential surface of recess 516. In addition to the stopping action of the stop assembly 60, the cam surface 458' can be provided with a protruding stop extension that can contact the follower 450' to prevent its rotation when the upper platen surface 50 is generally perpendicular to lower platen cooking surface 44.

When the upper platen ensemble 46" is pivoted downward, the follower 500 and piece 520 rotate in the opposite direction from that during the pivoting of the upper platen ensemble to the vertical position, until follower 500 becomes vertically aligned with vertical groove 510 so that follower 500 can descend through groove 510 until its lower end rests against the groove lower end 502 and the upper platen ensemble 46" is in its lowest position.

In the embodiments shown, the cam arrangement has been shown associated with the grill housing or base, and the cam follower arrangement shown associated with the upper platen ensemble. However, the locations of the cam arrangement and cam follower arrangement can be reversed with the cam arrangement associated with the upper platen ensemble such as by being secured in relation thereto, and the cam follower arrangement associated with the housing or base such as by being secured in relation thereto. In addition, the internal cam arrangement and cam follower arrangement that interact with the internal cam surfaces can be reversed to be an external cam arrangement and cam follower arrangement that interact with external cam surfaces.

Other changes can be made in the above constructions without departing from the scope of the invention, it is intended that all matter contained in the above description or shown in the accompanying drawings shall be interpreted as illustrative and not in a limiting sense.

The invention claimed is:

1. A food grill assembly for cooking human food, comprising:
a housing;
a lower platen associated with the housing, the lower platen having a cooking surface;
an upper platen ensemble comprising an upper platen having a cooking surface;
a guidance assembly defining a groove arrangement and comprising a cam surface and a cam follower arrangement configured for engagement with the groove arrangement and associated with the lower platen, with the upper platen and with the housing for guidance of the upward, downward, and pivotal movement of the upper platen ensemble relative to the lower platen; and
a handle assembly associated with the upper platen ensemble and with the guidance assembly so that movement of the handle assembly in a first direction will raise the upper platen relative to the lower platen, and movement of the handle assembly in a second direction will lower the upper platen relative to the lower platen;
the handle assembly being movably associated with the upper platen so that the associated structure of the guidance assembly with the upper platen ensemble allows the upper platen cooking surface to be moved to be substantially parallel with the lower platen cooking surface and in proximity with the cooking surface of the lower platen, and allows the upper platen ensemble to be moved upwardly therefrom for a distance of a gap between the lower platen cooking surface and the upper platen cooking surface to allow food to be positioned so that both the upper platen cooking surface and lower platen cooking surface are capable of being in contact with such food and so that the upper platen cooking surface and lower platen cooking surface are substantially parallel to each other during movement through the gap; wherein the cam follower arrangement comprises an upper roller and a lower roller mounted in association with the upper platen ensemble for correlative movement; and the guidance assembly further comprises support members mounted in association with the housing, the support members each defining the cam surfaces of the groove arrangement for the rollers to contact for movement of the rollers along the cam surfaces as the upper platen ensemble moves upwardly, downwardly, and pivotally relative to the lower platen; and
wherein the groove arrangement comprises a lower portion and a branched upper portion including a generally rearward extending first branch, and a generally forward extending second branch, whereby pivotal movement of the upper platen places the upper roller in the first branch and the lower roller in the second branch.

2. The food grill assembly of claim 1, further comprising:
a counterbalance assembly comprising a biasing assembly having a biasing member mounted in association with the housing and the upper platen ensemble to resist downward movement of the upper platen ensemble.

3. The food grill assembly of claim 1, wherein the gap between the lower platen cooking surface and the upper platen cooking surface through which the two surfaces remain substantially parallel is about three inches.

4. The food grill assembly of claims 1 further comprising, a stop assembly mounted in association with the guidance assembly, and sized and shaped to allow for placement in a first position to engage structure associated with the upper platen ensemble to halt upward movement of the upper platen ensemble, and placement in a second position so that the upper platen ensemble moves upwardly without the stop limiting such upper movement.

5. A food grill assembly for cooking human food, comprising:
a housing;
a lower platen associated with the housing, the lower platen having a cooking surface, the lower platen cooking surface having a rear edge;
an upper platen ensemble comprising an upper platen having a cooking surface, the upper platen cooking surface having a rear edge;
a guidance assembly comprising supports, each support defining a groove arrangement and comprising a cam surface and a cam follower arrangement configured for engagement with the groove arrangement and associated with the lower platen, with the upper platen and with the housing for guidance of the upward, downward, and pivotal movement of the upper platen ensemble; and
a handle assembly associated with the upper platen ensemble and with the guidance assembly so that movement of the handle assembly in a first direction will raise the upper platen relative to the lower platen, and movement of the handle assembly in a second direction will move the upper platen closer to the lower platen, the handle assembly being movably associated with the upper platen so that the associated structure of the guidance assembly with the supports and the association of the handle assembly structure with the upper platen ensemble allows the upper platen cooking surface to be moved to be in proximity with the cooking surface of the lower platen and allows the upper platen ensemble to be moved upwardly there from for a distance so that the upper platen cooking surface is positioned substantially perpendicular to the lower platen cooking surface; wherein the cam follower arrangement comprises an upper roller and a lower roller mounted in association with the upper platen ensemble for correlative movement; and the guidance assembly further comprises support members mounted in association with the housing, the support members each defining the cam surfaces of the groove arrangement for the rollers to contact for movement of the rollers along the cam surfaces as the upper platen ensemble moves upwardly, downwardly, and pivotally relative to the lower platen; and
wherein the groove arrangement comprises a lower portion and a branched upper portion including a generally rearward extending first branch, and a generally forward extending second branch, whereby pivotal movement of the upper platen places the upper roller in the first branch and the lower roller in the second branch.

6. The food grill assembly of claim 5, further comprising:
a counterbalance assembly comprising a biasing assembly with a biasing member mounted in association with the housing and upper platen ensemble to resist downward movement of the upper platen ensemble.

7. The food grill assembly of claim 5, wherein the relationship of the structure of the guidance assembly with the upper platen ensemble, lower platen ensemble and housing is such to resist movement further movement of the upper platen ensemble when the upper platen cooking surface is substantially perpendicular to the lower platen cooking surface with the rear edge of the upper platen cooking surface positioned to be forward of the rear edge of the lower platen cooking surface.

8. The food grill assembly of claim 5 further comprising, a stop assembly mounted in association with the guidance assembly, and sized and shaped to allow for placement in a first position to engage structure associated with the upper platen ensemble to halt upward movement of the upper platen ensemble, and placement in a second position so that the upper platen ensemble can move upwardly without engaging the stop.

9. The food grill assembly of claim 6, wherein the biasing assembly comprises at least one helical compression spring.

10. The food grill assembly of claim 9, wherein the at least one compression spring is a helically wound spring mounted to extend substantially vertically relative to the lower platen cooking surface.

11. The grill assembly of claim 5 wherein the cam surfaces are offset in the guidance assembly and at least one roller is offset relative to another roller.

12. A food grill assembly for cooking human food, comprising:
a housing;
a lower platen associated with the housing, the lower platen having a cooking surface;
an upper platen ensemble comprising an upper platen having a cooking surface;
a guidance assembly comprising support members mounted in association with the housing, the support members defining a groove arrangement; a plurality of rollers, the groove arrangement and plurality of rollers being configured for the plurality of rollers to be operatively engaged with the groove arrangement and associated with the lower platen, with the upper platen and with the housing for guidance of the upward, downward, and pivotal movement of the upper platen ensemble; and
a handle assembly associated with the upper platen ensemble and with the guidance assembly so that movement of the handle assembly in a first direction will raise the upper platen relative to the lower platen, and movement of the handle assembly in a second direction will lower the upper platen relative to the lower platen; the handle assembly being movably associated with the upper platen so that the associated structure of the guidance assembly with the upper platen ensemble allows the upper platen cooking surface to be moved to be substantially parallel with the lower platen cooking surface and in proximity with the cooking surface of the lower platen, and allows the upper platen ensemble to be moved upwardly therefrom for a distance of a gap between the lower platen cooking surface and the upper platen cooking surface to allow food to be positioned so that both the upper platen cooking surface and lower platen cooking surface are capable of being in contact with such food and so that the upper platen cooking surface and lower platen cooking surface are substantially parallel to each other during movement through the gap; wherein the cam follower arrangement comprises an upper roller and a lower roller mounted in association with the upper platen ensemble for correlative movement; and the guidance assembly further comprises support members mounted in association with the housing, the support members each defining the cam surfaces of the groove arrangement for the rollers to contact for movement of the rollers along the cam surfaces as the upper platen ensemble moves upwardly, downwardly, and pivotally relative to the lower platen; and wherein the groove arrangement comprises a lower portion and a branched upper portion including a generally rearward extending first branch, and a generally forward extending second branch, whereby pivotal movement of the upper platen places the upper roller in the first branch and the lower roller in the second branch.

13. The food grill assembly of claim 12, further comprising:

a counterbalance assembly comprising a biasing assembly having a biasing member mounted in association with the housing and the upper platen ensemble to resist downward movement of the upper platen ensemble.

14. The food grill assembly of claim 12 further comprising, a stop assembly mounted in association with the guidance assembly, and sized and shaped to allow for placement in a first position to engage structure associated with the upper platen ensemble to halt upward movement of the upper platen ensemble, and placement in a second position so that the upper platen ensemble can move upwardly without engaging the stop.

\* \* \* \* \*